(12) United States Patent
Sinha

(10) Patent No.: US 12,388,825 B2
(45) Date of Patent: Aug. 12, 2025

(54) SYSTEMS, METHODS AND COMPUTER PROGRAM PRODUCTS FOR CACHE DEVICE BASED REMOTE DATA RETRIEVAL FROM COMPUTING DEVICES

(71) Applicant: Spillbox Inc., San Jose, CA (US)

(72) Inventor: Alok Kumar Sinha, San Jose, CA (US)

(73) Assignee: Spillbox Inc., San Jose, CA (US)

( * ) Notice: Subject to any disclaimer, the term of this patent is extended or adjusted under 35 U.S.C. 154(b) by 217 days.

(21) Appl. No.: 18/230,801

(22) Filed: Aug. 7, 2023

(65) Prior Publication Data
US 2025/0055846 A1    Feb. 13, 2025

(51) Int. Cl.
*H04L 9/40* (2022.01)
*G06F 15/173* (2006.01)

(52) U.S. Cl.
CPC ........ *H04L 63/10* (2013.01); *G06F 15/17331* (2013.01)

(58) Field of Classification Search
CPC ........................... H04L 63/10; G06F 15/17331
See application file for complete search history.

(56) References Cited

U.S. PATENT DOCUMENTS

| | | |
|---|---|---|
| 7,743,019 B2 | 6/2010 | Shah et al. |
| 8,112,505 B1 | 2/2012 | Ben-Shaul et al. |
| 9,251,114 B1 | 2/2016 | Ancin et al. |
| 9,398,087 B1 | 7/2016 | Hosie et al. |
| 9,781,191 B2 | 10/2017 | Kashyap |
| 10,146,788 B1 | 12/2018 | Weatherall et al. |
| 10,148,493 B1 | 12/2018 | Ennis, Jr. et al. |
| 10,893,106 B1 | 1/2021 | Saladi et al. |
| 11,169,864 B2 | 11/2021 | Ranjan et al. |
| 2007/0244987 A1 | 10/2007 | Pedersen et al. |
| 2012/0072898 A1 | 3/2012 | Pappas et al. |
| 2012/0084333 A1 | 4/2012 | Huang et al. |
| 2014/0007079 A1 | 1/2014 | Whitney et al. |
| 2014/0052864 A1* | 2/2014 | Van Der Linden ..... H04L 47/70 709/226 |
| 2014/0067905 A1* | 3/2014 | Jansson ................. G06F 9/5033 709/202 |

(Continued)

OTHER PUBLICATIONS

International Search Report for PCT/IB2020/060778 mailed May 13, 2021. 2 pgs.

*Primary Examiner* — Michael R Vaughan
(74) *Attorney, Agent, or Firm* — Lerner David LLP

(57) ABSTRACT

The invention provides systems, methods and computer program products for executing remote application iteration (s) of client application software on a remote server platform, and for enabling each remote application iteration of a client application software to have access to a corresponding instance of an application software environment that has access to all data objects necessary for execution of such remote application iteration. The invention enables execution of a remote application iteration of a client software application at a remote server platform, through need-based or dynamic retrieval of data objects from an on-premise device for appropriately provisioning the remote server platform to execute the remote iteration of the client software application. The invention additionally relates to optimizing dynamic retrieval of data objects from a computing device/on-premise device through cache device(s) or cache server(s).

19 Claims, 14 Drawing Sheets

(56) References Cited

U.S. PATENT DOCUMENTS

| | | |
|---|---|---|
| 2014/0172783 A1 | 6/2014 | Suzuki et al. |
| 2014/0258872 A1 | 9/2014 | Spracklen et al. |
| 2015/0088942 A1 | 3/2015 | Shah |
| 2015/0193514 A1 | 7/2015 | Bradshaw et al. |
| 2015/0278323 A1 | 10/2015 | Melahn et al. |
| 2015/0286389 A1 | 10/2015 | Conover et al. |
| 2015/0356113 A1 | 12/2015 | Suryanarayanan et al. |
| 2016/0048408 A1 | 2/2016 | Madhu et al. |
| 2016/0119413 A1 | 4/2016 | Antipa et al. |
| 2016/0124665 A1 | 5/2016 | Jain et al. |
| 2016/0277497 A1 | 9/2016 | Bannister et al. |
| 2016/0321287 A1 | 11/2016 | Luthra et al. |
| 2016/0350326 A1 | 12/2016 | Simonetti |
| 2016/0364201 A1 | 12/2016 | Beveridge et al. |
| 2017/0017551 A1 | 1/2017 | Nichols et al. |
| 2017/0060702 A1 | 3/2017 | Dave et al. |
| 2017/0115980 A1 | 4/2017 | Bagal et al. |
| 2017/0168903 A1 | 6/2017 | Dornemann et al. |
| 2017/0264684 A1 | 9/2017 | Spillane et al. |
| 2017/0315794 A1* | 11/2017 | Zamir ................. G06F 8/61 |
| 2017/0364699 A1 | 12/2017 | Goldfarb et al. |
| 2018/0137174 A1 | 5/2018 | Cahana et al. |
| 2018/0300367 A1 | 10/2018 | Yu et al. |
| 2019/0205411 A1 | 7/2019 | Lai |
| 2019/0213265 A1 | 7/2019 | Boerner et al. |
| 2019/0266258 A1 | 8/2019 | Chen et al. |
| 2020/0007530 A1 | 1/2020 | Mohamad Abdul et al. |
| 2020/0201918 A1 | 6/2020 | Karande et al. |
| 2020/0311028 A1 | 10/2020 | Korepanov et al. |
| 2021/0132811 A1 | 5/2021 | Puvvada et al. |
| 2024/0411567 A1* | 12/2024 | Sinha ................. G06F 9/44521 |

\* cited by examiner

| User ID | Application ID | Remote Application Iteration ID | Environment Instance ID | On-Premise Application Information |
|---|---|---|---|---|
| | | | | |
| | | | | |
| | | | | |
| | | | | |
| | | | | |

SYSTEMS, METHODS AND COMPUTER PROGRAM PRODUCTS FOR CACHE DEVICE BASED REMOTE DATA RETRIEVAL FROM COMPUTING DEVICES

FIELD OF THE INVENTION

The present invention relates to the domain of cloud based or remote device based computing, and more particularly to methods, systems and computer program products for enabling remote device based execution of client software application(s) through dynamic retrieval of data objects by the remote device from a computing device/on-premise device. The invention additionally relates to optimizing dynamic retrieval of data objects from a computing device/on-premise device through cache device(s) or cache server(s).

BACKGROUND OF THE INVENTION

Cloud based or network based data centers for providing on-demand computing infrastructure has become widespread. Client application software that was previously executed only on computing devices within the premises of an entity or organization ("On-premise device(s)"), is now capable of being executed on remote servers or remote computing devices located at a remote facility outside the client premises (for example, within a server farm or cloud).

FIG. 1 illustrates an exemplary system environment 100 that is configured to provide a cloud based infrastructure for remote execution of client application software. System environment 100 comprises computing device 102 (or on-premise device 102), network 104 and remote server platform 106. For the purposes of the present invention the terms "computing device" and "on-premises device" may be used interchangeably, and shall be understood as referring to computing device 102/on-premise device 102 as illustrated in FIG. 1.

Computing device 102 may comprise any server 102a and/or other computing device 102b having a client application software installed thereon, and having a corresponding application environment implemented thereon. The application environment corresponding to the client application software comprises a plurality of data objects (e.g. software data files) stored within a file system associated with computing device 102—the one or more data objects comprising (i) application software data objects-comprising data objects that include application software code, application software libraries and/or application software data files, and/or (ii) user generated data objects—comprising user specific data or user generated data associated with operations of the application software code.

Network 104 may comprise any data network that enables data communication between entities connected to the network—and may in various non-limiting embodiments include any of a local area network, wide area network, distributed data network, or internetwork such as the Internet.

Remote server platform 106 comprises a remote server 106a and a memory or database 106b communicatively coupled thereto. Remote server 106a is configured to instantiate and run within remote server platform 106, a remote iteration (i.e. remote instance) of the client application software that is installed on computing device 102. For the purposes of instantiating and executing the remote iteration of the client application software, remote server platform 106 would have installed thereon, an iteration of executable application software code corresponding to the client application software. Additionally however, remote server 106a requires access to an application environment (within remote server platform 106), corresponding to the remote iteration of the client application software that is installed within remote server platform 106. The application environment within remote server platform 106 provides the remote iteration of the client application software with access to application software data objects and user generated data objects necessary for execution of the remote iteration of the client application software.

It would be understood that the application environment within remote server platform 106 requires to have stored therewithin, application software data objects and/or user generated data objects that are consistent with a corresponding application environment that is stored at computing device 102. Failure to ensure that the application environment within the remote server has access to all necessary data objects from an application environment within computing device 102 results in either (i) failure or error in execution of the remote iteration of the client application software, or (ii) data outputs from the remote iteration of the client application software that are inconsistent with data outputs that would have been generated by a corresponding execution of the client application software within computing device 102.

Existing solutions to enable cloud based execution of client application software resolve this problem by cloning or reproducing the entire application environment from computing device 102, at remote server platform 106, prior to executing the remote iteration of the client application software. This approach has been found to have several drawbacks.

The first serious drawback is that reproducing the entire application environment at remote server platform 106 is network resource intensive and time intensive. Depending on network bandwidth and network latency, the process of provisioning the necessary application environment within remote server platform 106 can involve significant amounts of time, and a large network overhead-arising from the need to reproduce all data objects within the application environment within computing device 102, regardless of whether they are actually required for the remote application iteration that is being executed at remote server platform 106.

Additionally, a user may want to run multiple remote iterations of the client application software within remote server platform 106—in which case, each remote iteration of the client application software will require to generate and provision a corresponding instance of the application environment at remote server platform 106. This exponentially increases the overhead and latency concerns—and in certain cases may place undesirable or unserviceable loads upon computing device 102. At the same time, generating a single common instance of the application environment at remote server platform 106 for use by all remote application iterations of the client application software is not feasible, as each remote application iteration of the client application software requires to independently operate on and effect state changes within the corresponding application environment—and changes made by a first remote application iteration of the client application software may interfere with the desired operation of a second remote application iteration of the client application software.

A recent advance over prior art solutions for cloud based execution of client application software involves executing remote application iteration(s) of client application software on a remote server platform, and for enabling each remote application iteration of a client application software to have access to a corresponding instance of an application software environment that contains or otherwise has access to data object(s) necessary for execution of the remote application iteration. This solution additionally enables execution of a remote application iteration of a client software application at a remote server platform, through need-based or dynamic retrieval of data objects from a computing device/on-premise device for provisioning (on the remote server platform) an instance of the client software application environment required for execution of the remote application iteration of the client software application.

However even this solution has certain drawbacks due to network latency and communication overheads involved in dynamic retrieval of data from a computing device/on-premise device, and transmission of such data to the requesting instance of the client software application environment in the cloud. Further complications arise when multiple instances of a client software application are instantiated in the cloud, and each application instance seeks to dynamically retrieve data from the computing device/on-premise device—in which situations, the computing device/on-premise device is typically unable to respond to the increased load/demand, and is also unable to scale up to meet the increased load/demand.

There is accordingly a need to improve or optimize solutions for dynamic retrieval of data from on-premise devices, for the purposes of enabling execution of remote application iteration(s) of client application software on a remote server platform, and for enabling each remote application iteration of a client application software to have access to a corresponding instance of an application software environment that has access to all necessary data objects required for execution of that remote application iteration.

SUMMARY

The present invention relates to the domain of cloud based or remote device based computing, and more particularly to methods, systems and computer program products for enabling remote device based execution of client software application(s) through dynamic retrieval of data objects by the remote device from a computing device/on-premise device. The invention additionally relates to optimizing dynamic retrieval of data objects from a computing device/on-premise device through cache device(s) or cache server(s).

The invention provides a method for execution of an application software iteration at a remote server through network based access to a on-premise device. The method comprises (i) instantiating at the remote server (a) a remote application iteration of a client application software, wherein said client application software has a corresponding local instance of an application environment stored on the on-premise device, and (b) a remote application environment instance that is configured to permit access by the remote application iteration, wherein said remote application environment instance does not include all data objects stored within the local instance of an application environment stored on the on-premise device, (ii) executing at the remote server, application software code corresponding to the remote application iteration, (iii) identifying data required by the application software code under execution, (iv) selecting one of a first data retrieval process and a second data retrieval process for retrieving the identified data, wherein (c) the first data retrieval process is selected in response to determining that the identified data comprises a data object, (d) the second data retrieval process is selected in response to determining that the identified data comprises metadata, and (v) implementing the selected first data retrieval process or second data retrieval process for retrieving the identified data, wherein (e) implementing the first data retrieval process comprises transmitting a request for retrieval of the identified data to a first data source (f) implementing the second data retrieval process comprises transmitting a request for retrieval of the identified data to a second data source, and (g) the first data source and the second data source are distinct.

In an embodiment, the method further comprises (i) storing retrieved data that has been retrieved through implementation of the selected first data retrieval process or second data retrieval process, within the remote application environment instance, and (ii) executing the application software code corresponding to the remote application iteration, based on the retrieved data.

In another method embodiment, the first data source is a cache device assigned to the on-premise device, and the second data source is the on-premise device.

In a particular method embodiment, implementing the first data retrieval process comprises (i) transmitting from the remote server to a cache device assigned to the on-premise device, a request for retrieval of the data object that comprises the identified data, and (ii) responding to a determination that the requested data object is stored at the cache device by (a) retrieving the requested data object from a memory of the cache device, and (b) transmitting the requested data object from the cache device to the remote server.

In an embodiment of the method, implementing the first data retrieval process comprises (i) transmitting from the remote server to a cache device assigned to the on-premise device, a request for retrieval of the data object that comprises the identified data, and (ii) responding to a determination that the requested data object is not stored at the cache device by (a) retrieving the requested data object from a memory of the on-premise device, and (b) transmitting the requested data object from the on-premise device to the remote server.

In another embodiment of the method, transmission of the requested data object from the on-premise device to the remote server circumvents the cache device.

In a specific embodiment of the method, the requested data object is transmitted from the on-premise device to the remote server through the cache device, and a copy of the data object received from the on-premise device is stored at the cache device.

In an embodiment of the method, implementing the second data retrieval process comprises (i) transmitting from the remote server to the on-premise device, a request for retrieval of the metadata that comprises the identified data, (ii) retrieving the requested metadata from a memory of the on-premise device, and (iii) transmitting the requested metadata from the on-premise device to the remote server.

In an embodiment, the method further comprises (i) transmitting metadata or a data object that has been generated or modified at the remote server, from the remote server to the on-premise device, and (ii) storing the transmitted metadata or data object in a memory of the on-premise device.

The invention also provides a system for execution of an application software iteration at a remote server through network based access to a on-premise device, the system comprising a remote server configured for (i) instantiating (a) a remote application iteration of a client application software, wherein said client application software has a corresponding local instance of an application environment stored on the on-premise device, and (b) a remote application environment instance that is configured to permit access by the remote application iteration, wherein said remote application environment instance does not include all data objects stored within the local instance of an application environment stored on the on-premise device, (ii) executing at the remote server, application software code corresponding to the remote application iteration, (iii) identifying data required by the application software code under execution, (iv) selecting one of a first data retrieval process and a second data retrieval process for retrieving the identified data, wherein (c) the first data retrieval process is selected in response to determining that the identified data comprises a data object, (d) the second data retrieval process is selected in response to determining that the identified data comprises metadata, and (v) implementing the selected first data retrieval process or second data retrieval process for retrieving the identified data, wherein (c) implementing the first data retrieval process comprises transmitting a request for retrieval of the identified data to a first data source, (f) implementing the second data retrieval process comprises transmitting a request for retrieval of the identified data to a second data source, and (g) the first data source and the second data source are distinct.

In an system embodiment, said remote server is further configured for (i) storing retrieved data that has been retrieved through implementation of the selected first data retrieval process or second data retrieval process, within the remote application environment instance, and (ii) executing the application software code corresponding to the remote application iteration, based on the retrieved data.

In another system embodiment (i) the first data source is a cache device assigned to the on-premise device, and (ii) the second data source is the on-premise device.

In an embodiment of the system, the remote server is configured such that implementing the first data retrieval process comprises (i) transmitting from the remote server to a cache device assigned to the on-premise device, a request for retrieval of the data object that comprises the identified data, and (ii) responding to a determination that the requested data object is stored at the cache device by (a) retrieving the requested data object from a memory of the cache device, and (b) transmitting the requested data object from the cache device to the remote server.

In an embodiment of the system, the remote server is configured such that implementing the first data retrieval process comprises (i) transmitting from the remote server to a cache device assigned to the on-premise device, a request for retrieval of the data object that comprises the identified data, and (ii) responding to a determination that the requested data object is not stored at the cache device by (a) retrieving the requested data object from a memory of the on-premise device, and (b) transmitting the requested data object from the on-premise device to the remote server.

In a system embodiment, transmission of the requested data object from the on-premise device to the remote server circumvents the cache device.

In a system embodiment (i) the requested data object is transmitted from the on-premise device to the remote server through the cache device, and (ii) a copy of the data object received from the on-premise device is stored at the cache device.

In a particular embodiment of the system the remote server is configured such that implementing the second data retrieval process comprises (i) transmitting from the remote server to the on-premise device, a request for retrieval of the metadata that comprises the identified data, (ii) retrieving the requested metadata from a memory of the on-premise device, and (iii) transmitting the requested metadata from the on-premise device to the remote server.

In another embodiment of the system, a the remote server is configured for (i) transmitting metadata or a data object that has been generated or modified at the remote server, from the remote server to the on-premise device, and (ii) storing the transmitted metadata or data object in a memory of the on-premise device.

The invention also provides a computer program product for execution of an application software iteration at a remote server through network based access to an on-premise device, comprising a non-transitory computer usable medium having a computer readable program code embodied therein, the computer readable program code comprising instructions for implementing within a processor based computing system, the steps of (i) instantiating at the remote server (a) a remote application iteration of a client application software, wherein said client application software has a corresponding local instance of an application environment stored on the on-premise device, and (b) a remote application environment instance that is configured to permit access by the remote application iteration, wherein said remote application environment instance does not include all data objects stored within the local instance of an application environment stored on the on-premise device, (ii) executing at the remote server, application software code corresponding to the remote application iteration, (iii) identifying data required by the application software code under execution, (iv) selecting one of a first data retrieval process and a second data retrieval process for retrieving the identified data, wherein (c) the first data retrieval process is selected in response to determining that the identified data comprises a data object, (d) the second data retrieval process is selected in response to determining that the identified data comprises metadata, and (v) implementing the selected first data retrieval process or second data retrieval process for retrieving the identified data, wherein (c) implementing the first data retrieval process comprises transmitting a request for retrieval of the identified data to a first data source (f) implementing the second data retrieval process comprises transmitting a request for retrieval of the identified data to a second data source, and (g) the first data source and the second data source are distinct.

In more specific embodiments, the computer program product is configured to implement any one of more steps of the methods of the invention as are described throughout this specification.

BRIEF DESCRIPTION OF THE ACCOMPANYING DRAWINGS

FIG. 3B illustrates an exemplary data structure configured for enabling remote execution of client application software.

DETAILED DESCRIPTION

The invention provides systems, methods and computer program products for executing remote application iteration(s) of client application software on a remote server platform, and for enabling each remote application iteration of a client application software to have access to a corresponding instance of an application software environment that contains or otherwise has access to data object(s) necessary for execution of the remote application iteration. The invention additionally enables execution of a remote application iteration of a client software application at a remote server platform, through need-based or dynamic retrieval of data objects from a computing device/on-premise device for provisioning (on the remote server platform) an instance of the client software application environment required for execution of the remote application iteration of the client software application. Still further, the invention optimizes dynamic retrieval of data objects from a computing device/on-premise device through cache device(s) or cache server(s).

Figure 1:
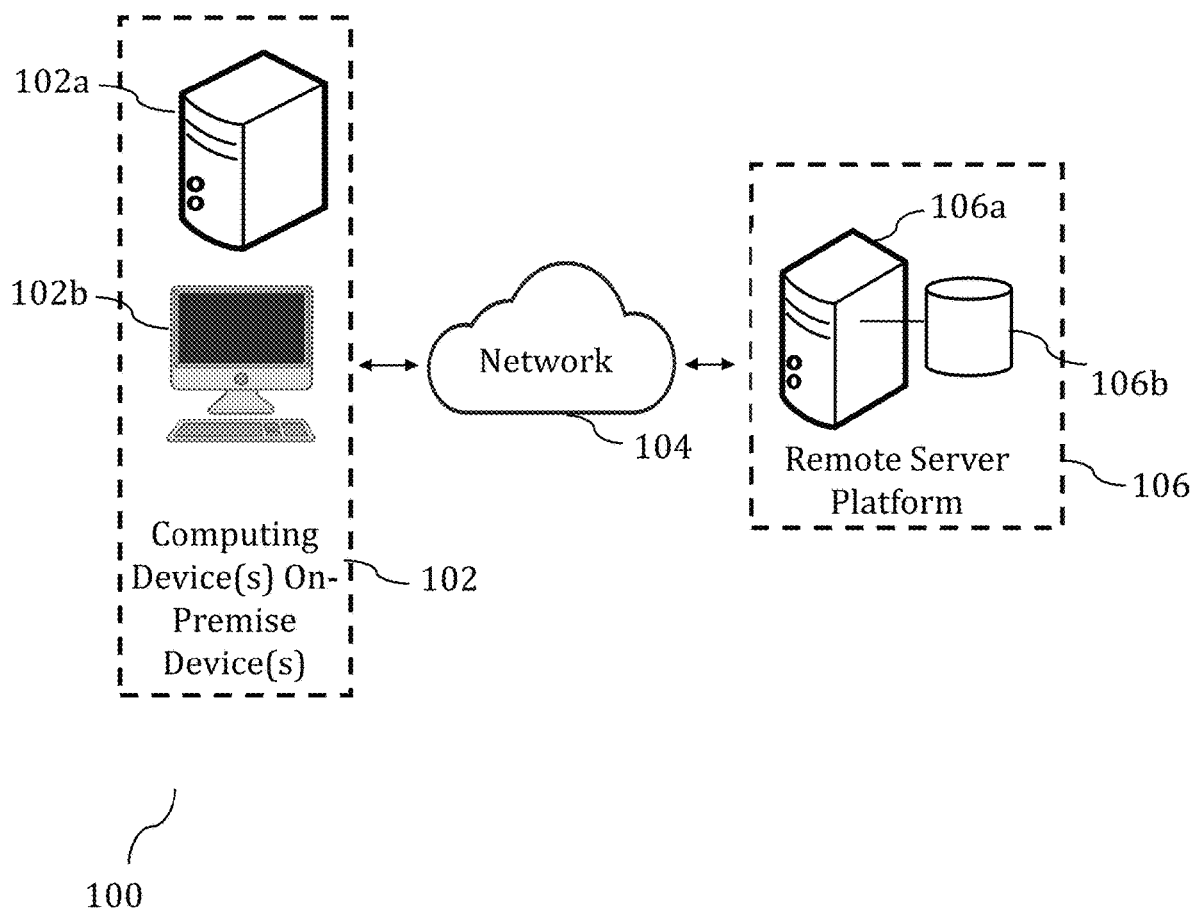
FIGS. 1, 2 and 3A illustrate system environments that are configured to provide a cloud based infrastructure for remote execution of client application software.
Figure 2:
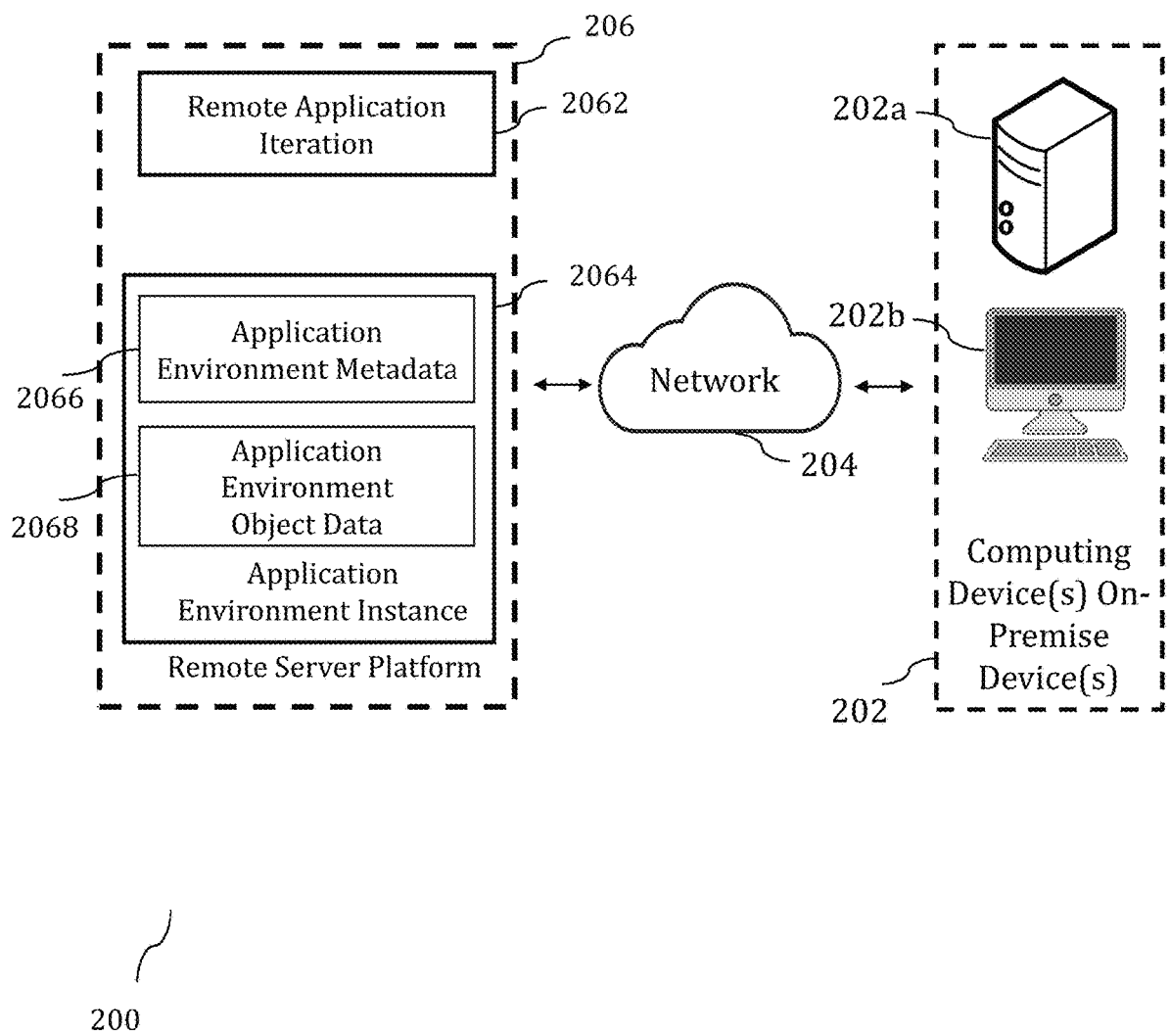

FIG. 2 illustrates a system environment 200 configured for remote execution of client application software based on dynamic retrieval of data object(s) from a computing device/on-premise device.

System environment 200 comprises computing device/on-premise device 202, network 204 and remote server platform 206.

Computing device 202 may comprise any server 202a and/or other data processing device 202b having a client application software installed thereon, and having a corresponding application environment implemented thereon. The application environment corresponding to the client application software comprises a plurality of data objects (e.g. software data files) stored within a file system associated with computing device 202—the one or more data objects comprising (i) application software data objects—comprising data objects that include application software code, and application software attribute data and/or (ii) user generated data objects—comprising user data associated with operations of the application software code.

Network 204 may comprise any data network that enables data communication between entities connected to the network—and may in various non-limiting embodiments include any of a local area network, wide area network, distributed data network, or internetwork such as the Internet.

Remote server platform 206 comprises at least one remote application iteration 2062 implemented on a remote server or a processor within remote server platform 206. Remote application iteration 2062 is a remote instance of a client application software that is installed on computing device 202, which remote instance is being executed within remote server platform 206.

Remote server platform 206 additionally comprises an application environment instance 2064 that is generated or implemented within remote server platform 206—and more particularly within a memory within or coupled with remote server platform 206. Application environment instance 2064 is a local instance of an application environment corresponding to the remote application iteration of the client application software that is installed or running within remote server platform 206. This application environment instance 2064 within remote server platform 206 provides remote application iteration 2062 of the client application software, with access to application software data objects and user generated data objects that are required for execution of the remote application iteration 2062 at remote server platform 206.

As shown in FIG. 2, application environment instance 2064 comprises application environment metadata 2066 and application environment object data 2068. The application environment metadata 2066 and application environment object data 2068 provide remote application iteration 2062 with access to application software data objects and user generated data objects that are required for execution of the remote application iteration 2062 at remote server platform 206. It would be understood that application software data objects may comprise data objects that include application software code, application software libraries and application software data files, while user generated data objects may comprise user specific data or user generated data associated with operations of the application software code.

Application environment object data 2068 may include any one or more of data files or data records stored within a file system, one or more directories, folders or file paths within the file system, and one or more directories, folders or file paths that include any of nested data files, nested data records, nested directories or nested folders.

Application environment metadata 2066 comprises one or more data items, data elements or data records that describes attributes of a data file, data record, directory, folder, or file path within a file system. The attributes described by application environment metadata 2066 may include without limitation, one or more of file size, file location, owner and type of the file, file access permissions (e.g. read, write, execute), owner and type of the directory, file contents within a directory, date of file creation, date of last file modification, date of directory creation, date of last directory modification etc.

During execution of remote application iteration 2062 within remote server platform 206, the remote application iteration 2062 retrieves and relies on application environment object data 2068 and application environment metadata 2066 within application environment instance 2064. The application environment metadata 2066 and application environment object data 2068 is retrieved from computing device/on-premise device 202 through network 204 and is stored within remote server platform 206 (according to embodiments of the invention that are described in more detail below), for enabling execution of remote application iteration 2062. In particular embodiments, retrieval of application environment metadata 2066 and application environment object data 2068 from on-premise device 202 is controlled or implemented by remote application iteration 2062—which may be configured for network based communication with, and data retrieval from, on-premise device 202.

In certain embodiments of the present invention, remote server platform 206 enables execution of a plurality of remote application iterations corresponding to a client software application, on one or more remote servers or processors within remote server platform 206.

Figure 3A:
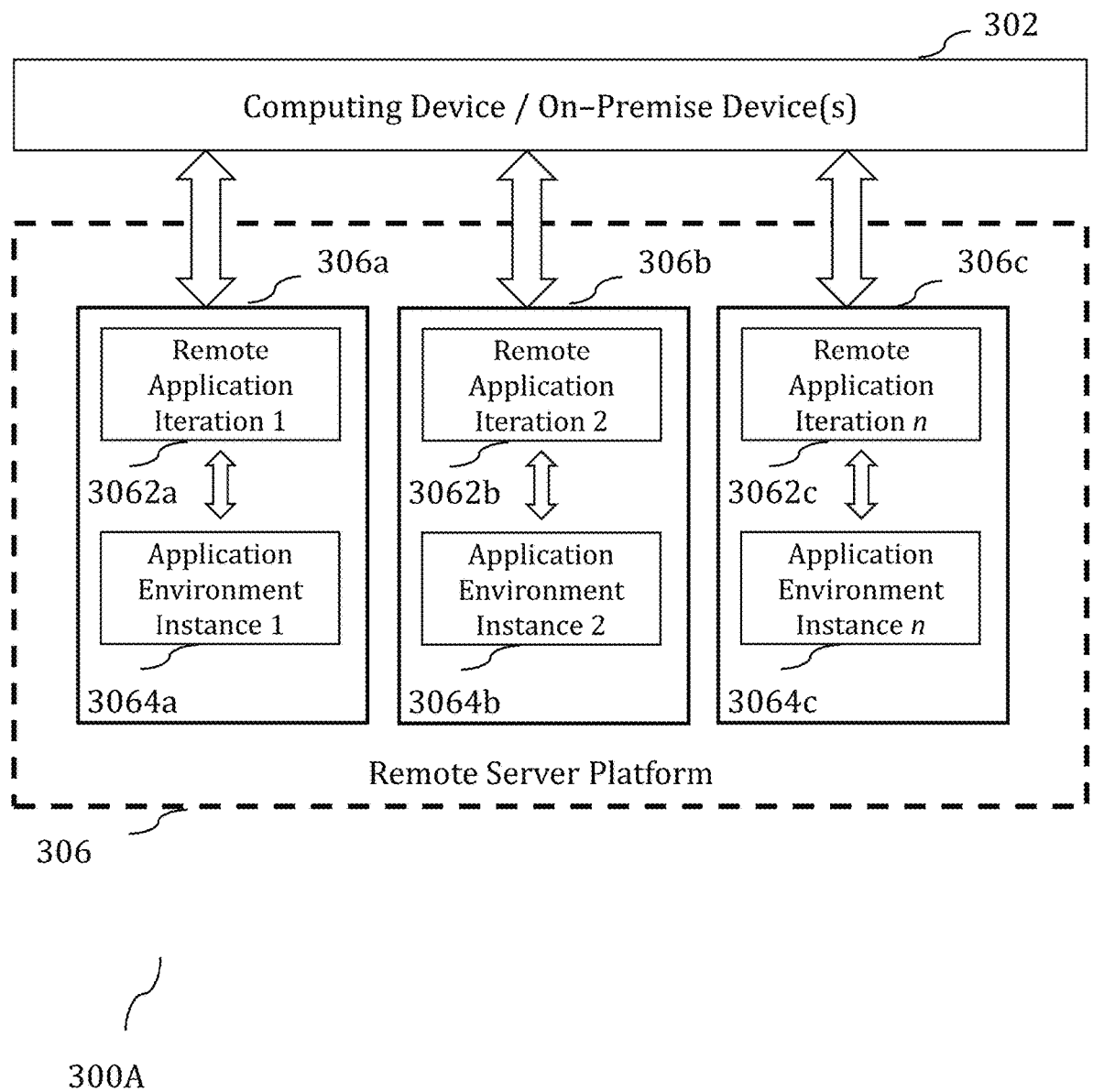

FIG. 3A illustrates an embodiment of a system environment 300A configured in accordance with the teachings of the present invention for remote execution of a plurality of remote application iterations corresponding to a client application software.

System environment 300A comprises computing device/on-premise device 302, and remote server platform 306 that are communicatively coupled with each other through one or more communication networks (not shown in the Figure).

As in the case of system environment 200, computing device/on-premise device 302 within system environment 300A may comprise any server and/or other computing device having a client application software installed thereon, and having a corresponding application environment implemented thereon.

In the embodiment of FIG. 3A, remote server platform 306 is configured to remotely execute n remote iterations of a client software application—wherein each remotely executed iteration within remote server platform 306 comprises an implementation of a remote application iteration and a corresponding application environment instance. In system environment 300A, a first remote iteration 306a of the client software application comprises remote application iteration 1 (3062a) and a corresponding application environment instance 1 (3064a), a second remote iteration 306b of the client software application comprises remote application iteration 2 (3062b) and a corresponding application environment instance 2 (3064b), upto an $n^{th}$ remote iteration 306c of the client software application which comprises remote application iteration n (3062c) and a corresponding application environment instance n (3064c).

As discussed above in connection with FIG. 2, each remote application iteration 3062a, 3062b and 3062c is a remote executed instance of a client application software that is installed on computing device/on-premise device 302 that is being executed within remote server platform 306.

Additionally, each of remote application iterations 1 to n (3062a, 3062b and 3062c) has a corresponding application environment instance 1 to n (3064a, 3064b, 3064c) that is generated for and coupled with said remote application iteration. The application environment instances 1 to n (3064a, 3064b, 3064c) are stored within a memory within or coupled with remote server platform 306. Each application environment instance 1 to n (3064a, 3064b, 3064c) provides its respective remote application iteration 1 to n (3062a, 3062b, 3062c) of the client application software, with access to application software data objects and user generated data objects that are required for execution of the remote application iterations 1 to n (3062a, 3062b, 3062c) at remote server platform 306.

While not specifically illustrated in FIG. 3A, each application environment instance 1 to n (3064a, 3064b, 3064c) comprises application environment metadata and application environment object data of the type described above in connection with FIG. 2.

During execution of each remote application iteration 1 to n (3062a, 3062b, 3062c) within remote server platform 306, each of the remote application iterations 1 to n retrieves and relies on application environment object data and application environment metadata within the corresponding application environment instance 1 to n (3064a, 3064b, 3064c). The application environment metadata and application environment object data is retrieved from computing device/on-premise device 302 and is stored within remote server platform 306 according to embodiments of the invention that are described in more detail below, for the purposes of enabling execution of remote application iterations 1 to n (3062a, 3062b, 3062c). In particular embodiments of the invention, retrieval of application environment metadata and application environment object data from computing device/on-premise device 302 is controlled or implemented by the concerned remote application iteration 1 to n (3062a, 3062b, 3062c)—which may be configured for network based communication with, and data retrieval from, on-premise device 302.

In embodiments of the invention where system environment 300A is used for remote execution of a plurality of remote application iterations 1 to n (3062a, 3062b, 3062c) corresponding to a client application software, the system environment may rely on one or more data records to correlate client application software that is being remotely executed, with the plurality of running remote application iterations 1 to n (3062a, 3062b, 3062c), and with their respective application environment instances 1 to n (3064a, 3064b, 3064c), and additionally with the user that has initiated or is controlling the plurality of running remote application iterations 1 to n (3062a, 3062b, 3062c).

Figure 12:
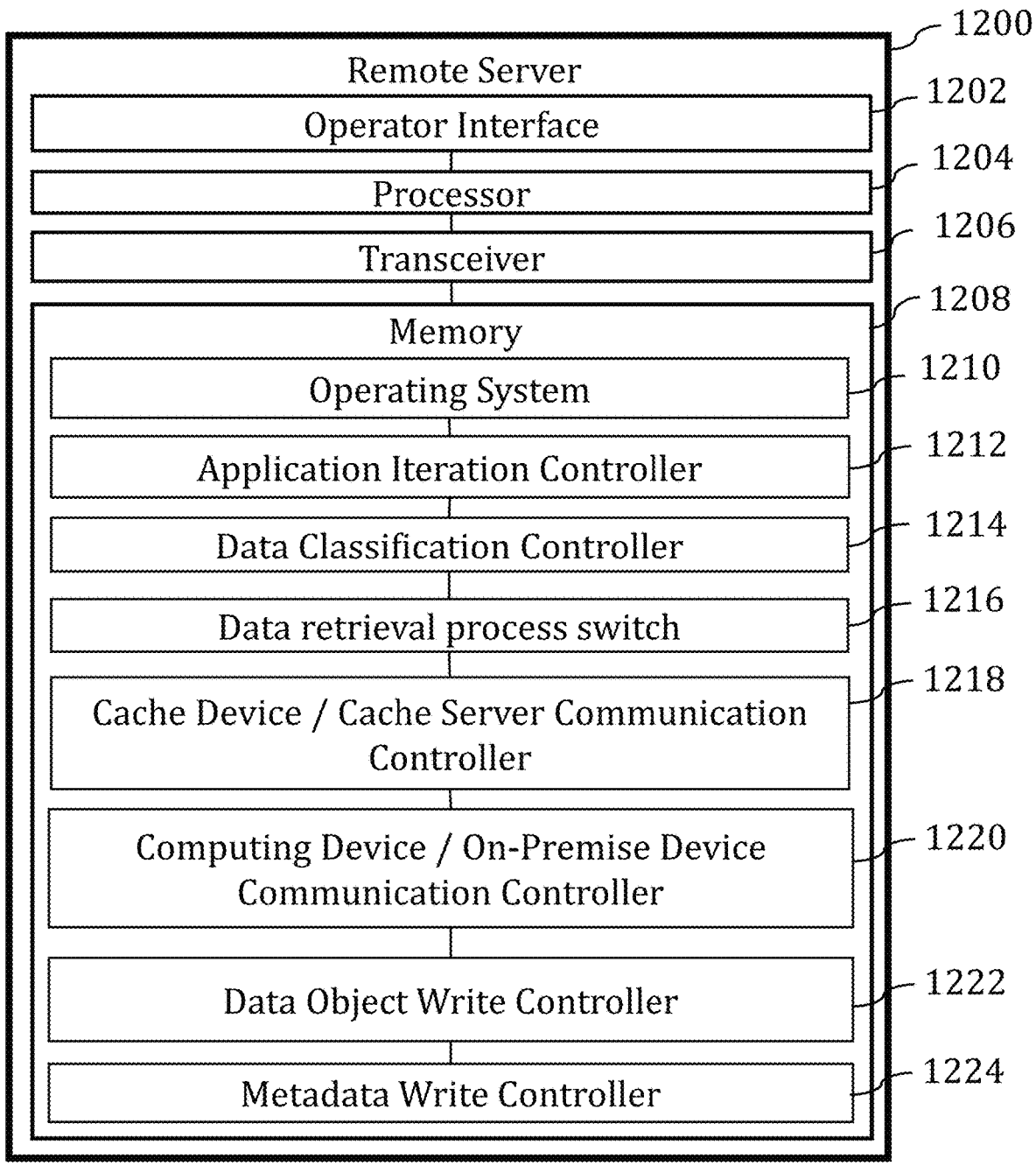
FIG. 12 illustrates an exemplary remote server 1100 configured to implement the present invention.

In an embodiment remote server platform 306 may comprise one or more remote servers. In a particular embodiment, the one or more remote servers may comprise a remote server 1200 as shown in FIG. 12.

FIG. 3B illustrates an exemplary data structure 300B of a type that may be used to generated data records (of the kind described above), that may be used to correlate client application software that is being remotely executed, with the plurality of running remote application iterations.

As shown in FIG. 3B, exemplary data structure 300B comprises data fields 308 to 316.

Data field 308 is used to store a User ID associated with a particular remote application iteration that is being executed within system environment 300A. The User ID comprises a unique identifier associated with a user or a user account associated with the system environment 300A and which user or user account is responsible for or controls the execution of the corresponding one or more running or stored remote application iterations 3062a, 3062b, 3062c corresponding to a client application software within system environment 300A.

Data field 310 is used to store an Application ID associated with a particular remote application iteration that is being executed within system environment 300A. The Application ID comprises a unique identifier associated with the client application software, remote application iteration(s) whereof are being executed within system environment 300A.

Data field 312 is used to store a Remote Application Iteration ID for each remote application iteration that is being executed within system environment 300A. The Remote Application Iteration ID comprises a unique identifier associated with a specific remote application iteration corresponding to a client application software that is being executed within system environment 300A.

Data field 314 is used to store an Environment Instance ID associated with a particular remote application iteration that is being executed within system environment 300A. The Environment Instance ID comprises a unique identifier associated with a specific application environment instance that is generated for and coupled with a particular remote application iteration.

Data field 316 is used to store on-premise application information corresponding to a particular remote application iteration that is being executed within system environment 300A. The on-premise application information may comprise any information, network addresses, storage addresses, and/or other data location pointers, describing a computing device/on-premise device at which the on-premise client application software is installed, an application environment within the computing device/on-premise device that corresponds to the client application software, and/or one or more data objects corresponding to the client application software that are stored within said application environment.

It would be understood that one or more (or each) remote application iteration 3062a, 3062b, 3062c executed within system environment 300A may have (and in some embodiments would necessarily have) a corresponding data record of the type discussed in connection with FIG. 3B, wherein the data record would store the User ID, Application ID, Remote Application Iteration ID and Environment Instance ID corresponding to said remote application iteration. The data elements within said data record would enable processing entities within system environment 300A to correlate and appropriately retrieve and transmit data records and data messages between remote application iterations and their corresponding remote application environment instances, and a corresponding client application software or application environment that is implemented within a computing device/on-premise device—to enable execution of each such remote application iteration.

Moving back to FIG. 3A, in an alternate embodiment of the invention described above in connection with FIG. 3A, a plurality of remote application iterations 1 to n (3062a, 3062b, 3062c) may be configured to retrieve and rely on application environment object data and application environment metadata within a single application environment instance—i.e. any one of application environment instances 1 to n (3064a, 3064b, 3064c). In a more particular embodiment, each application environment instance 1 to n (3064a, 3064b, 3064c) may be associated with a specific user, and one more remote application iterations initiated by, operated by, controlled by, or associated with that specific user, may be configured to retrieve and rely on application environment object data and application environment metadata within the application environment instance associated with that same user.

Figure 4:
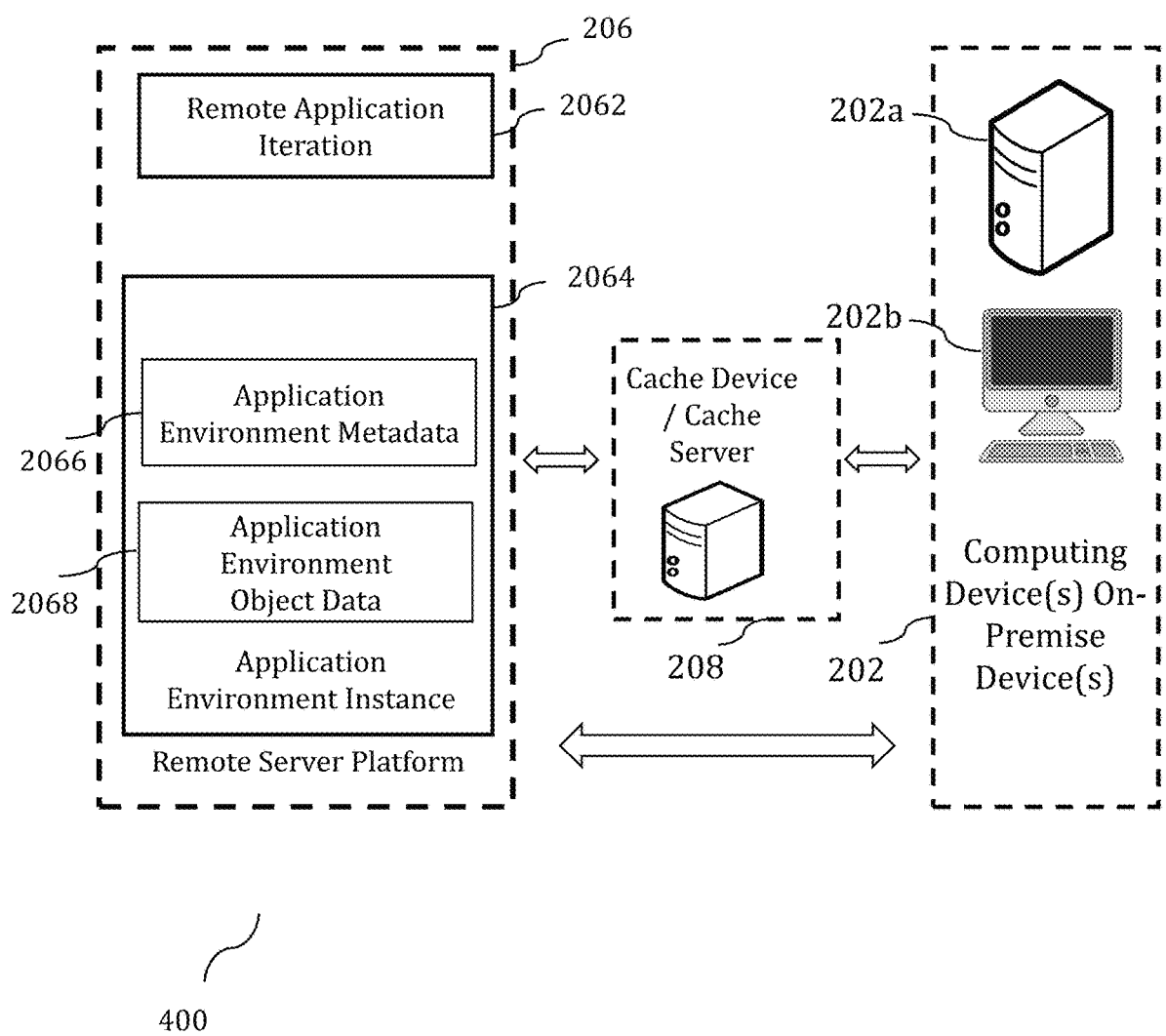
FIGS. 4 and 5 illustrate system environments that are configured to provide a cloud based infrastructure for remote execution of client application software, in accordance with the present invention.

FIG. 4 illustrates a system environment 400 configured for implementing the present invention—wherein a cache device/cache server 208 enables optimized retrieval of data from a computing device/on-premise device, for the purposes of remote execution of client application software based on the retrieved data.

System environment 400 comprises computing device/on-premise device 202, a cache device/cache server 208, and remote server platform 206. Although not shown in FIG. 4, it would be understood that in specific embodiments, data communication between any of computing device/on-premise device 202, cache device/cache server 208 and remote server platform 206, may rely on one or more communication networks or physical or logical communication channels.

Computing device/on-premise device 202 may comprise any server 202a and/or other data processing device 202b having a client application software installed thereon, and having a corresponding application environment implemented thereon. The application environment corresponding to the client application software comprises a plurality of data objects (e.g. software data files) stored within a file system associated with computing device 202—the one or more data objects comprising (i) application software data objects—comprising data objects that include application software code, and application software attribute data and/or (ii) user generated data objects—comprising user data associated with operations of the application software code. In various embodiments, computing device/on-premise device 202 is configured in the manner described hereinabove in connection with FIG. 2.

Cache device/cache server 208 comprises a processor implemented device including at least one data processor, and a memory. In embodiments, cache device/cache server 208 may include a transitory memory, and/or a non-transitory memory. The cache device/cache server 208 may be strategically configured to be positioned as a network communication intermediate between computing device/on-premise device 202 and remote server platform 206. In an embodiment, cache device/cache server 208 may comprise an edge device or an edge server positioned as a communication proxy between computing device/on-premise device 202 and remote server platform 206. In an embodiment, cache device/cache server 208 may comprise an edge device or an edge server positioned at an on-premises edge associated with or corresponding to computing device/on-premise device 202. In a specific embodiment cache device/cache server 208 may comprise an edge device or an edge server of a content delivery network (CDN). In certain embodiments, cache device/cache server 208 is configured to store one or more data objects retrieved from computing device/on-premise device 202, and to transmit one or more of such data objects to remote server platform 206, in response to a request received from remote server platform 206, for one or more of such data objects. The cache device/cache server 208 caches data objects that originates from/are retrieved from computing device/on-premise device 202, so that the cached data is available in a more geographically, physically, or logically proximate location to remote server platform 206. Such proximate storage of cached data results in reducing one or more of data retrieval time, data retrieval cost, and network communication latency, insofar as remote application iterations being executed within remote server platform 206, are concerned.

Remote server platform 206 comprises at least one remote application iteration 2062 implemented on a remote server or a processor within remote server platform 206. Remote application iteration 2062 is a remote instance of a client application software that is installed on computing device 202, wherein said remote instance is being executed within remote server platform 206.

Remote server platform 206 of FIG. 4 additionally comprises application environment instance 2064 that is generated or implemented within remote server platform 206—and more particularly within a memory within or coupled with remote server platform 206. Application environment instance 2064 is a local instance of an application environment corresponding to the remote application iteration of the client application software that is installed or running within remote server platform 206. This application environment instance 2064 within remote server platform 206 provides remote application iteration 2062 of the client application software, with access to application software data objects and user generated data objects that are required for execution of the remote application iteration 2062 at remote server platform 206.

As shown in FIGS. 2 and 4, application environment instance 2064 comprises application environment metadata 2066 and application environment object data 2068. The application environment metadata 2066 and application environment object data 2068 provide remote application iteration 2062 with access to application software data objects and user generated data objects that are required for execution of the remote application iteration 2062 at remote server platform 206. It would be understood that application software data objects may comprise data objects that include application software code, application software libraries and application software data files, while user generated data objects may comprise user specific data or user generated data associated with operations of the application software code.

Application environment object data 2068 may include any one or more of data files or data records stored within a file system, one or more directories, folders or file paths within the file system, and one or more directories, folders or file paths that include any of nested data files, nested data records, nested directories or nested folders.

Application environment metadata 2066 comprises one or more data items, data elements or data records that describes attributes of a data file, data record, directory, folder, or file path within a file system. The attributes described by application environment metadata 2066 may include without limitation, one or more of file size, file location, owner and type of the file, file access permissions (e.g. read, write, execute), owner and type of the directory, file contents within a directory, date of file creation, date of last file modification, date of directory creation, date of last directory modification etc.

During execution of remote application iteration 2062 within remote server platform 206, the remote application iteration 2062 retrieves and relies on application environment object data 2068 and application environment metadata 2066 within application environment instance 2064. As described in more detail subsequently, (i) the application environment metadata 2066 is retrieved from computing device/on-premise device 202, and (ii) and application environment object data 2068 is retrieved from one of computing device/on-premise device 202 and cache device/cache server 208, and is stored within remote server platform 206 (according to embodiments of the invention that are described in more detail below), for enabling execution of remote application iteration 2062. In particular embodiments, retrieval of application environment metadata 2066 and application environment object data 2068 is controlled or implemented by remote application iteration 2062—which may be configured for network based communication with, and data retrieval from, computing device/on-premise device 202 and/or cache device/cache server 208.

In certain embodiments of the present invention, remote server platform 206 enables execution of a plurality of remote application iterations corresponding to a client software application, on one or more remote servers or processors within remote server platform 206.

In an embodiment remote server platform 206 may comprise one or more remote servers. In a particular embodiment, one or more of said remote server(s) may comprise a remote server 1200 as shown in FIG. 12.

In embodiments of the system environment 400 illustrated in FIG. 4 (i) computing device/on-premise device 202 is capable of transmitting data to and retrieving data from each of remote server platform 206 and cache device/cache server 208, (ii) cache device/cache server 208 is capable of transmitting data to and receiving data from each of remote server platform 206 and computing device/on-premise device 202, and/or (iii) remote server platform 206 is capable of transmitting data to and receiving data from each of computing device/on-premise device 202 and cache device/cache server 208.

Figure 5:
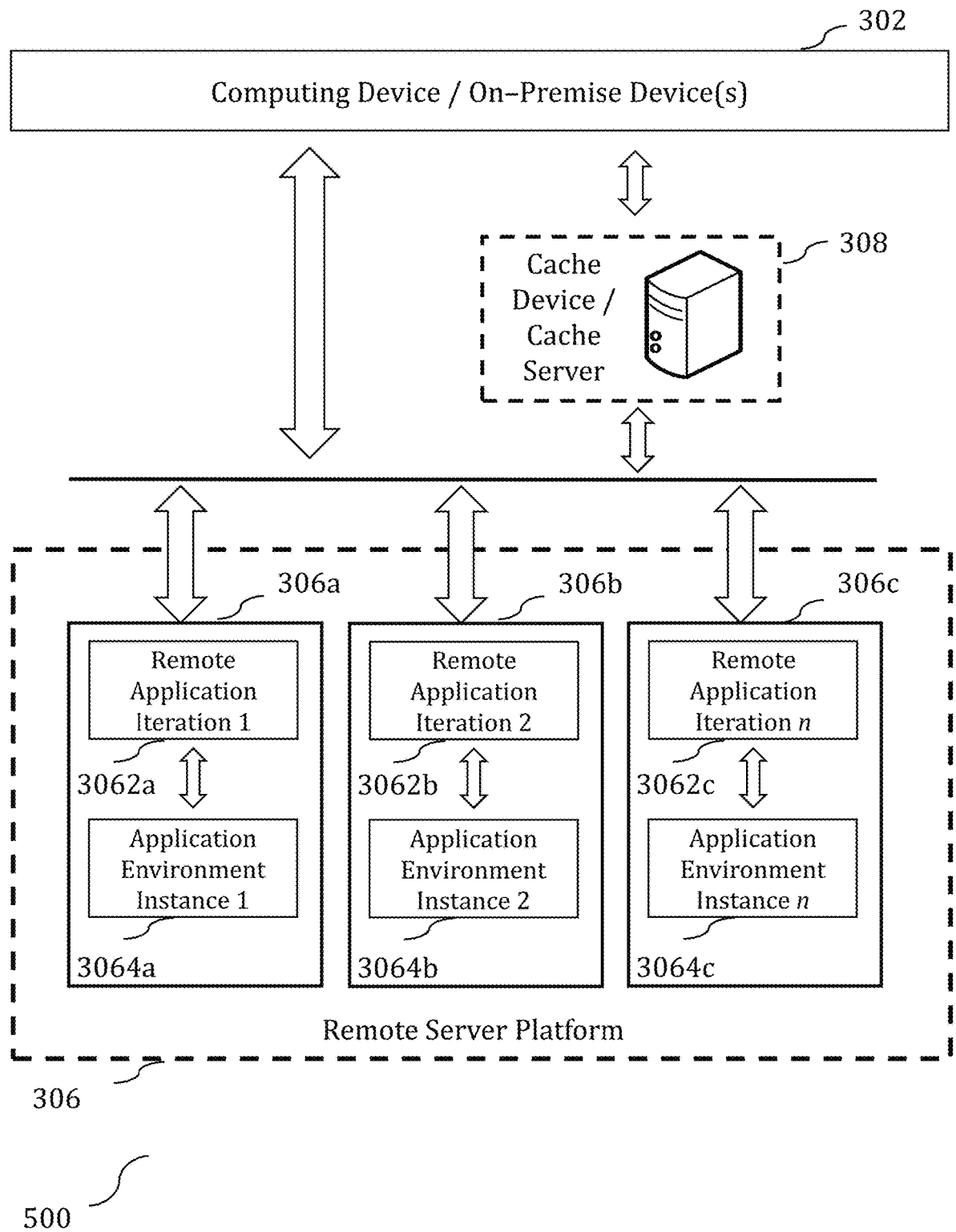

FIG. 5 illustrates a system environment 500 configured for implementing the present invention—wherein remote server platform 206 is configured to enable execution of a plurality of remote application iterations corresponding to a client software application, on one or more remote servers or processors within remote server platform 206.

System environment 500 comprises computing device/on-premise device 302, remote server platform 306, and a cache device/cache server 308 configured to enable optimized retrieval of data by remote server platform 306 from computing device/on-premise device 302, for the purposes of remote execution of client application software based on the retrieved data. Although not shown in FIG. 5, it would be understood that in specific embodiments, data communication between any of computing device/on-premise device 302, cache device/cache server 308 and remote server platform 306, may rely on one or more communication networks or physical or logical communication channels.

As discussed above (in connection with FIG. 3A), computing device/on-premise device 302 within system environment 300A may comprise any server and/or other computing device having a client application software installed thereon, and having a corresponding application environment implemented thereon. In various embodiments, computing device/on-premise device 302 is configured in the manner described hereinabove in connection with FIG. 3A.

Cache device/cache server 308 comprises a processor implemented computing device having at least one data processor, and a memory. In embodiments, cache device/cache server 308 may include a transitory memory, and/or a non-transitory memory. The cache device/cache server 308 may be strategically configured to be positioned as a network communication intermediate between computing device/on-premise device 302 and remote server platform 306. In an embodiment, cache device/cache server 308 may comprise an edge device or an edge server positioned as a communication proxy between computing device/on-premise device 302 and remote server platform 306. In a specific embodiment cache device/cache server 308 may comprise an edge device or an edge server of a content delivery network (CDN). In certain embodiments, cache device/cache server 308 is configured to store one or more data objects retrieved from computing device/on-premise device 302, and to transmit one or more of such data objects to remote server platform 306, in response to a request received from remote server platform 306, for one or more of such data objects. The cache device/cache server 308 caches data objects that originates from/is retrieved from computing device/on-premise device 302, so that the cached data is available in a more geographically, physically, or logically proximate location to remote server platform 306. Such proximate storage of cached data can reduce any of data retrieval time, data retrieval cost, and network communication latency, insofar as remote application iterations being executed within remote server platform 306, are concerned.

Remote server platform 306 is configured to remotely execute n remote iterations of a client software application—wherein each remotely executed iteration within remote server platform 306 comprises an implementation of a remote application iteration and a corresponding application environment instance. In system environment 300A, a first remote iteration 306a of the client software application comprises remote application iteration 1 (3062a) and a corresponding application environment instance 1 (3064a), a second remote iteration 306b of the client software application comprises remote application iteration 2 (3062b) and a corresponding application environment instance 2 (3064b), upto an n' remote iteration 306c of the client software application which comprises remote application iteration n (3062c) and a corresponding application environment instance n (3064c).

Each remote application iteration 3062a, 3062b and 3062c is a remote executed instance of a client application software that is installed on computing device/on-premise device 302 that is being executed within remote server platform 306.

Additionally, each of remote application iterations 1 to n (3062a, 3062b and 3062c) has a corresponding application environment instance 1 to n (3064a, 3064b, 3064c) that is generated for and coupled with said remote application iteration. The application environment instances 1 to n (3064a, 3064b, 3064c) are stored within a memory within or coupled with remote server platform 306. Each application environment instance 1 to n (3064a, 3064b, 3064c) provides its respective remote application iteration 1 to n (3062a, 3062b, 3062c) of the client application software, with access to application software data objects and user generated data objects that are required for execution of the remote application iterations 1 to n (3062a, 3062b, 3062c) at remote server platform 306.

While not specifically illustrated in FIG. 5, each application environment instance 1 to n (3064a, 3064b, 3064c) comprises application environment metadata and application environment object data of the type described above.

During execution of each remote application iteration 1 to n (3062a, 3062b, 3062c) within remote server platform 306, each of the remote application iterations 1 to n retrieves and relies on application environment object data and application environment metadata within the corresponding application environment instance 1 to n (3064a, 3064b, 3064c). The application environment metadata and application environment object data is retrieved from computing device/on-premise device 302 and is stored within remote server platform 306 according to embodiments of the invention that are described in more detail below, for the purposes of enabling execution of remote application iterations 1 to n (3062a, 3062b, 3062c). In particular embodiments of the invention, retrieval of application environment metadata and application environment object data from computing device/on-premise device 302 is controlled or implemented by the concerned remote application iteration 1 to n (3062a, 3062b, 3062c)—which may be configured for network based communication with, and data retrieval from, on-premise device 302.

In embodiments of the invention where system environment 500 is used for remote execution of a plurality of remote application iterations 1 to n (3062a, 3062b, 3062c) corresponding to a client application software, the system environment may rely on one or more data records to correlate client application software that is being remotely executed, with the plurality of running remote application iterations 1 to n (3062a, 3062b, 3062c), and with their respective application environment instances 1 to n (3064a, 3064b, 3064c), and additionally with the user that has initiated or is controlling the plurality of running remote application iterations 1 to n (3062a, 3062b, 3062c).

In the embodiment shown in FIG. 5 (i) computing device/on-premise device 302 is capable of transmitting data to and retrieving data from each of remote server platform 306 and cache device/cache server 308, (ii) cache device/cache server 308 is capable of transmitting data to and receiving data from each of remote server platform 306 and computing device/on-premise device 302, and (iii) remote server platform 306 is capable of transmitting data to and receiving data from each of computing device/on-premise device 302 and cache device/cache server 308.

Figure 6:
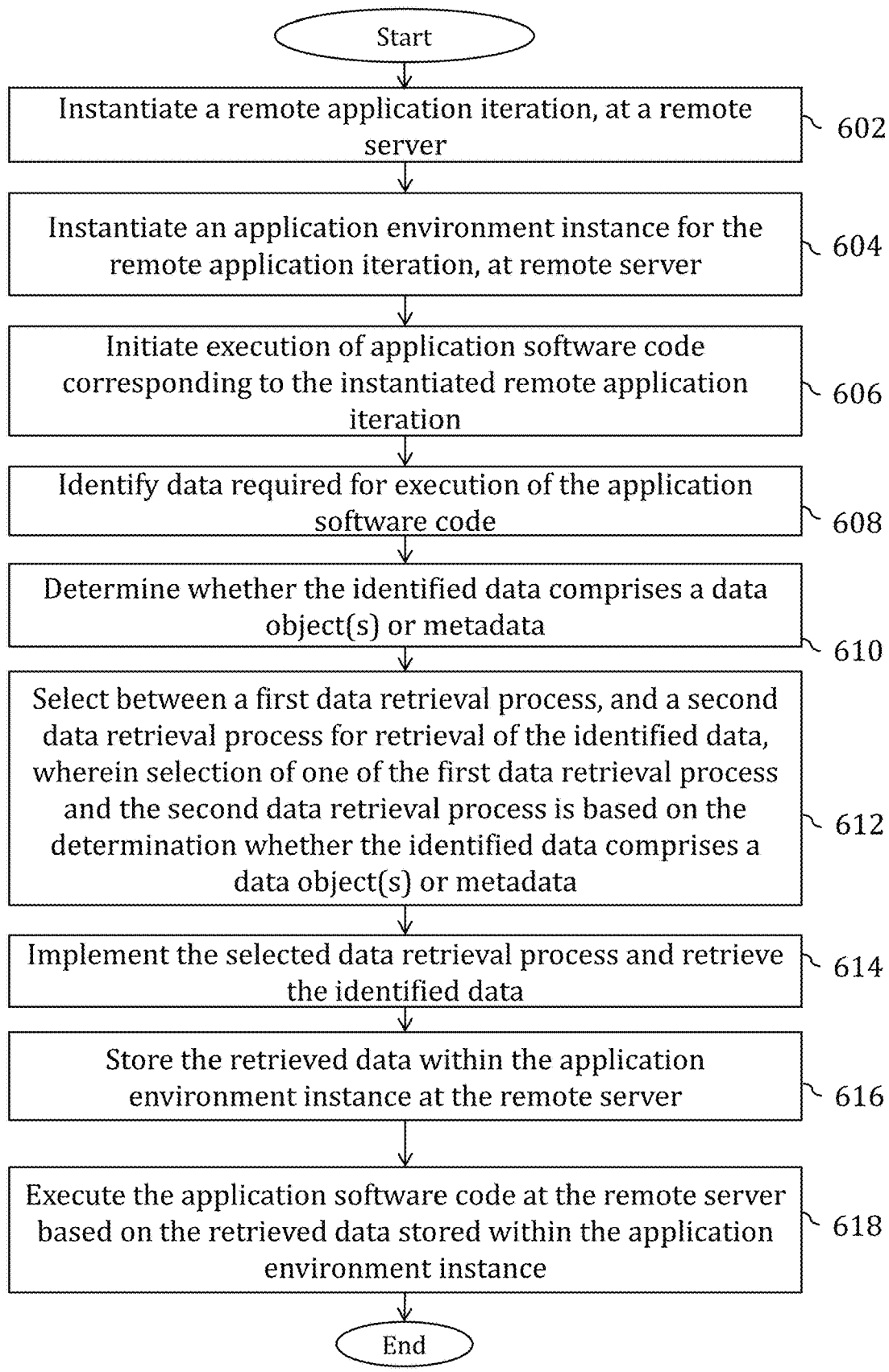
FIG. 6 is a flowchart illustrating a method of executing a remote iteration of a client software application at a remote server platform based on dynamic retrieval of data from a computing device/on-premise device, in accordance with the present invention.

FIG. 6 is a flowchart illustrating a method of executing a remote iteration of a client software application at a remote server platform 206, 306 based on dynamic retrieval of data from a computing device/on-premise device 202, 302 for provisioning an instance of a client software application environment maintained at the remote server platform 206, 306. The method of FIG. 6 may be implemented partially or wholly within a remote server 1200 within a remote server platform (206, 306) of the type illustrated in FIGS. 2, 3A, 4 and 5.

Step 602 comprises instantiation of a remote application iteration at a remote server 1200. The remote server 1200 may comprise a server within a remote server platform 206, 306 within system environment 200, 300A. The remote application iteration at the remote server may be instantiated in response to receiving an instruction (for example a user instruction or a system instruction) for instantiation. In a particular embodiment, the instruction for instantiation may include one or more of (i) information identifying the client software application for which a remote application iteration is intended to be run (for example, by way of an Application ID), (ii) information identifying a specific on-premise instance of a client software application and/or corresponding application environment, to which the remote application iteration corresponds, (iii) information identifying a user or user account instantiating or controlling the remote application iteration, and/or (iv) information identifying or describing an on-premise device at which the on-premise client application software is installed.

Step 604 comprises instantiating or generating at the remote server, an application environment instance corresponding to the remote application iteration that has been instantiated at step 602.

Step 606 comprises initiating at the remote server, execution of application software code corresponding to the remote application iteration instantiated at step 602. In an embodiment of the method, the application software code under execution may be retrieved from a memory associated with or communicably coupled with the remote server.

Step 608 comprises identifying data, required by the application software code under execution. In a particular embodiment, identification of the data occurs after execution of the application software code has been initiated at step 606. In an embodiment, the identified data is unavailable within a memory accessible by or coupled with remote server 1200 or remote server platform 206, 306.

In a preferred embodiment, the identification of data at step 608 is an event based (or "dynamic") identification. The identification of data required for execution of the application software code may be achieved in multiple ways. In one embodiment, identification of data (that is required by the application software code under execution) is based on receiving from the application software code under execution, an application call, or application request or application data message requesting the data. In another embodiment, identification of data required for execution of the application software code may be a predictive identification—wherein the required data is identified based on predictive methods or algorithms, in advance of (or prior to) receiving (from the application software code under execution), an application call, or application request or application data message requesting the data. In yet another embodiment, the identification of data required for execution of the application software code may be a rule and event based identification—wherein the required data is identified based on detection of one or more events or one or more changes in data state, and the required data is identified based on one or more rules, indicia or heuristics that associate the detected event(s) or change(s) in state with data that would be required for execution of the application software code.

Step 610 comprises determining whether the identified data comprises a data object(s) required for execution of the application software code, or metadata required for execution of the application software code.

In an embodiment, when the identified data comprises data object(s) required for execution of the application software code, said data object(s) may comprise one or more application software data object(s) and/or one or more user generated data object(s). It would be understood that application software data object(s) may comprise data objects that include application software code, application software libraries and application software data files, while user generated data objects may comprise user specific data or user generated data associated with operations of the application software code.

In an embodiment, when the identified data comprises metadata, said metadata comprises one or more data items, data elements or data records that describes attributes of a data file, data record, directory, folder, or file path within a file system. The attributes described by the identified metadata may include without limitation, one or more of file size, file location, owner and type of the file, file access permissions (e.g. read, write, execute), owner and type of the directory, file contents within a directory, date of file creation, date of last file modification, date of directory creation, date of last directory modification etc.

Step 612 comprises selecting between a first data retrieval process and as second data retrieval process for retrieval of the identified data (i.e. the data identified at step 608)—wherein selection of one of the first data retrieval process and the second data retrieval process is based on the determination whether the identified data comprises a data object(s) or metadata (i.e. the determination at step 610). In an embodiment of the method (i) responsive to a determination that the identified data comprises a data object(s), step 612 comprises selecting the first data retrieval process for retrieval of the data object(s), and (ii) responsive to a determination that the identified data comprises metadata, step 612 comprises selecting the second data retrieval process for retrieval of the metadata. The first data retrieval process comprises transmitting a request for retrieval of the data object(s) to a first data source, and the second data retrieval process comprises transmitting a request for retrieval of the metadata to a second data source, wherein the first data source and the second data source are distinct (i.e. are different from each other). In an embodiment, the first data source is cache device/cache server 208, 308, and the second data source is computing device/on-premise device 202, 302. The first and second data retrieval processes are described in more detail below.

Step 614 comprises implementing the selected data retrieval process (i.e. the first data retrieval process or the second data retrieval process selected at step 612), and retrieving the identified data through the selected data retrieval process.

Step 616 comprises storing the data that has been retrieved at step 614 within the application environment instance (that has been instantiated at step 604) at remote server 1200.

Step 618 comprises executing the application software code at remote server 1200, based on the retrieved data (that has been retrieved at step 614) that has been stored within the relevant application environment instance at step 616.

The method of FIG. 6 recognizes that any retrieval of metadata necessarily requires to be comprise retrieval of metadata from the computing device/on-premise device 202, 302—for the reason that metadata provided to an application environment instance for the purposes of enabling execution of a corresponding remote application iteration at a remote server, necessarily has to be metadata that is up-to-date and/or completely identical with current metadata at the computing device/on-premise device 202, 302. This is even more the case since metadata is often updated frequently at the computing device/on-premise device 202, 302, and the consequences of providing outdated metadata from a cache server can be quite severe- and should be avoided. Since the data size of metadata is typically small, real time retrieval of such metadata directly from the computing device/on-premise device 202, 302 is implementable without any significant network latency or any unbearable load on the computing device/on-premise device 202, 302, regardless of the number of times metadata requires to be retrieved by the remote server. On the other hand, application software data object(s) and/or generated data object(s) are larger in size—and frequent retrieval requests for such data object(s) from the remote server would result in network latency and undesired loads on the computing device/on-premise device 202, 302. Additionally, such data object(s) may also be subject to fewer updates in comparison with metadata, and for that reason retrieval of such data object(s) from a cache server offers an acceptable solution. By treating requests for retrieval of metadata differently from requests for retrieval of data object(s)—and routing such requests differently from each other, the method of FIG. 6 reduces network latency and loads on computing device/on-premise device 202, 302, resulting in faster and more efficient operations of the overall system.

Figure 7:
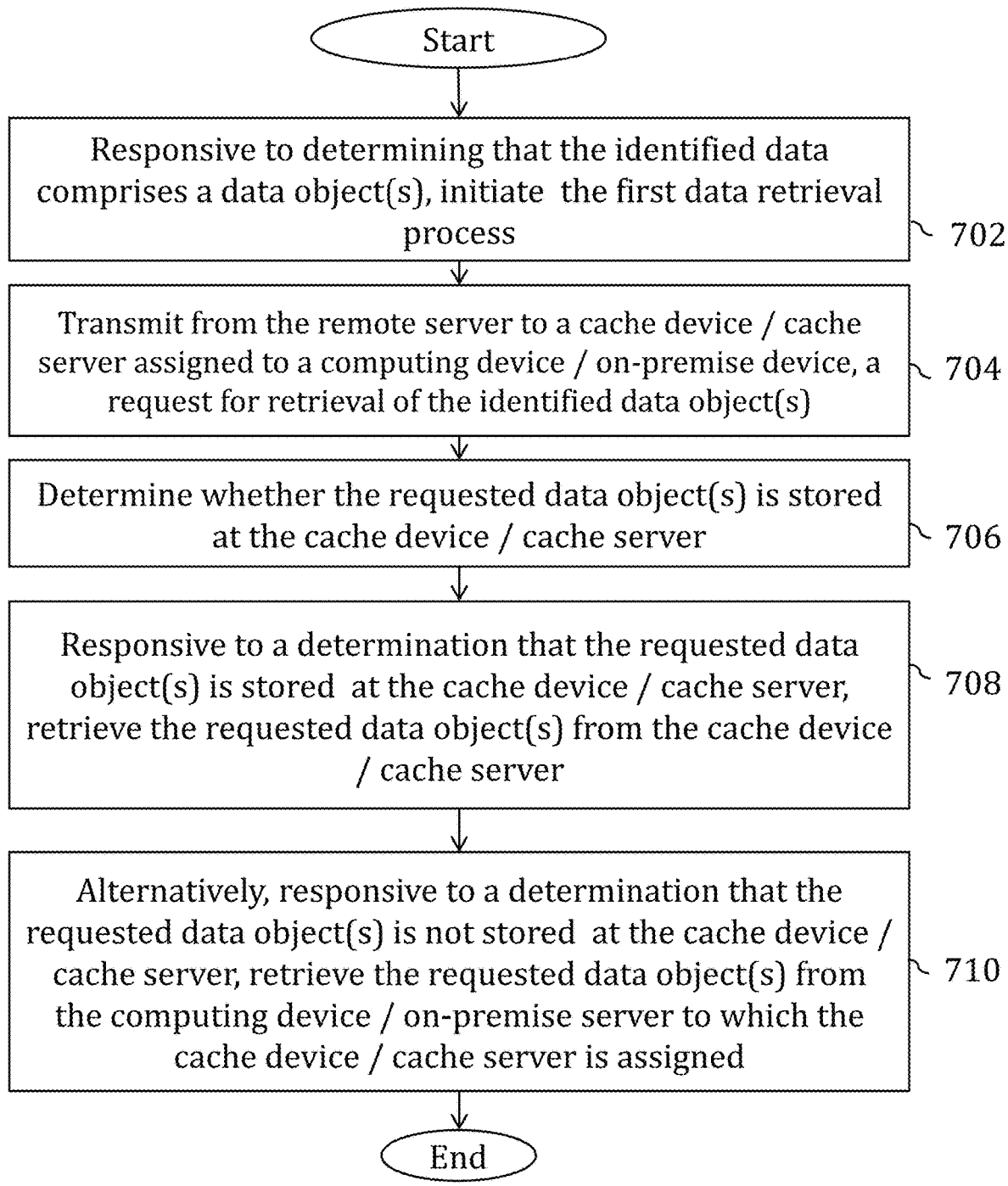
FIG. 7 is a flowchart illustrating implementation of a first data retrieval process from the method of FIG. 6.

FIG. 7 is a flowchart illustrating implementation of the first data retrieval process within the method of FIG. 6 (i.e. the first data retrieval process that is selectively implemented at steps 612 and 614). The method of FIG. 7 may be implemented partially or wholly within the system environments 400, 500 of FIGS. 4 and 5 respectively.

Step 702 comprises responding to a determination (at step 610 of the method of FIG. 6) that the identified data comprises data object(s) required for execution of the application software code, by initiating the first data retrieval process. In an embodiment, step 702 may be implemented at remote server 1200 (i.e. a remote server within a remote server platform 206, 306.

Step 704 comprises transmitting from remote server 1200 to a cache device/cache server 208, 308 (that corresponds to or that has been assigned to, a computing device/on-premise device 202, 302) a request for retrieval of the identified data object(s).

Step 706 comprises determining (at the cache device/cache server 208, 308) whether the requested data object(s) is stored at the cache device/cache server 208, 308.

At step 708, responsive to a determination that the requested data object(s) is stored at the cache device/cache server 208, 308, the requested data object(s) is retrieved from the cache device/cache server 208, 308 and is transmitted from the cache device/cache server 208, 308 to remote server 1200.

Alternatively, responsive to a determination that the requested data object(s) is not stored at the cache device/cache server, step 710 comprises retrieving the requested data object(s) from the computing device/on-premise device 202, 302 to which the cache device/cache server 208, 308 is assigned or corresponds. In an embodiment, at step 710 the requested data object(s) may be retrieved from the computing device/on-premise device 202, 302 and transmitted to remote server 1200, without being first transmitted to the cache device/cache server 208, 308. In another embodiment, at step 710 the requested data object(s) may be retrieved from the computing device/on-premise device 202, 302 and transmitted to the cache device/cache server 208, 308—whereinafter the cache device/cache server 208, 308 transmits the requested data object onward to remote server 1200, while optionally storing a copy of the data object(s) received from the computing device/on-premise device 202, 302 at the cache device/cache server 208, 308 itself.

The data object(s) received from the cache device/cache server 208, 308 or from the computing device/on-premise device 202, 302 may be stored within the application environment instance (corresponding to the instance of an application software that requires the data object(s)) at remote server 1200.

Figure 8:
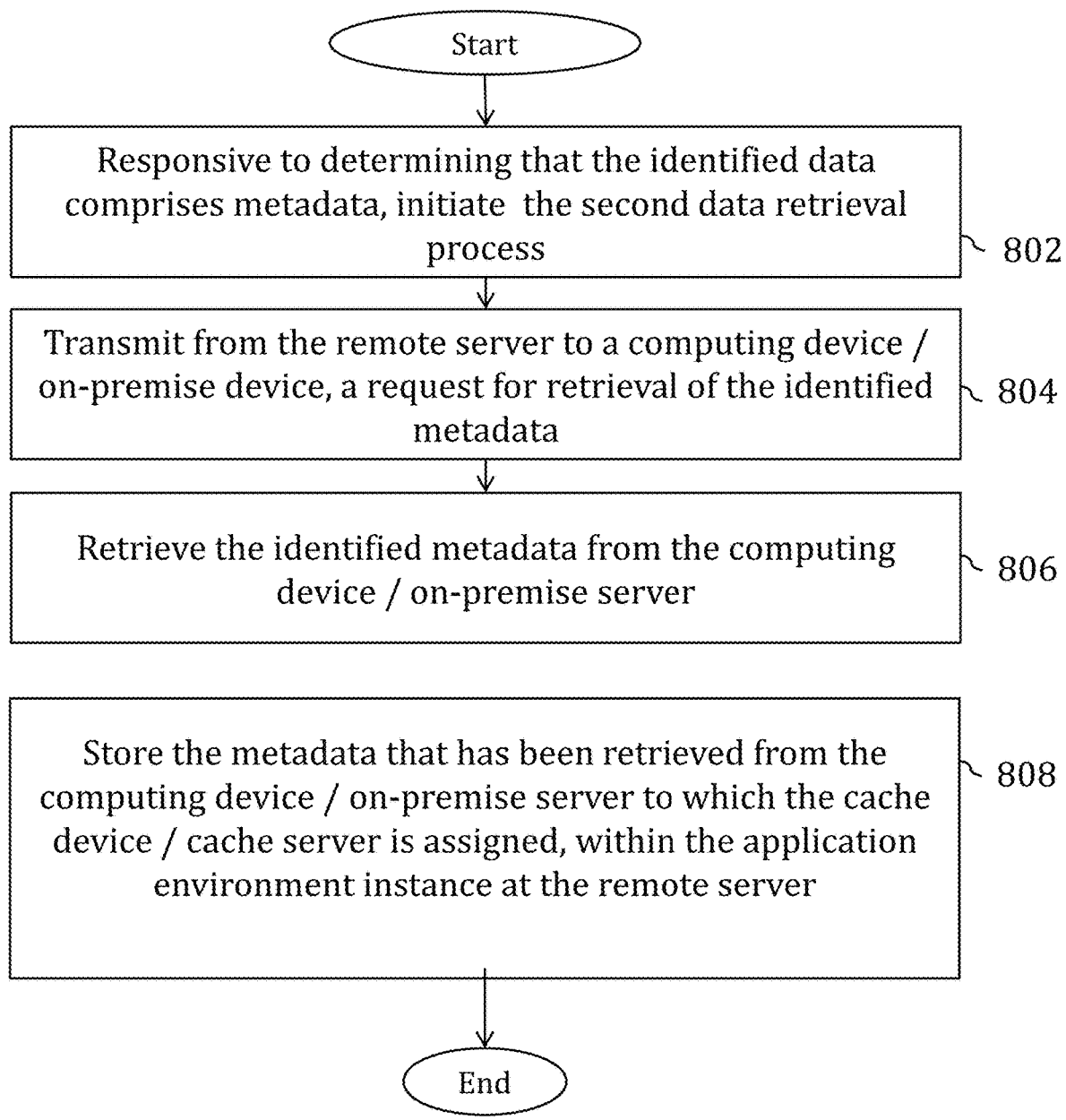
FIG. 8 is a flowchart illustrating implementation of a second data retrieval process from the method of FIG. 6.

FIG. 8 is a flowchart illustrating implementation of the second data retrieval process within the method of FIG. 6 (i.e. the second data retrieval process that is selectively implemented at steps 612 and 614) The method of FIG. 8 may be implemented partially or wholly within the system environments 400, 500 of FIGS. 4 and 5 respectively.

Step 802 comprises responding to a determination (at step 610 of the method of FIG. 6) that the identified data comprises metadata, by initiating the second data retrieval process. In an embodiment, step 802 may be implemented at remote server 1200 (i.e. a remote server within remote server platform 206, 306.

Step 804 comprises transmitting from remote server 1200 to the relevant computing device/on-premise device 202, 302, a request for retrieval of the identified metadata.

At step 806, the requested metadata is retrieved from the computing device/on-premise device 202, 302, and is transmitted from the computing device/on-premise device 202, 302 to remote server 1200. In an embodiment, the metadata is transmitted directly to remote server 1200, while circumventing (i.e. not passing through or not being first transmitted to) cache device/cache server 208, 308.

Step 808 comprises storing the metadata that has been retrieved from the computing device/on-premise device 202, 302, within the application environment instance (corresponding to the instance of an application software that requires the metadata) at the remote server.

Figure 9:
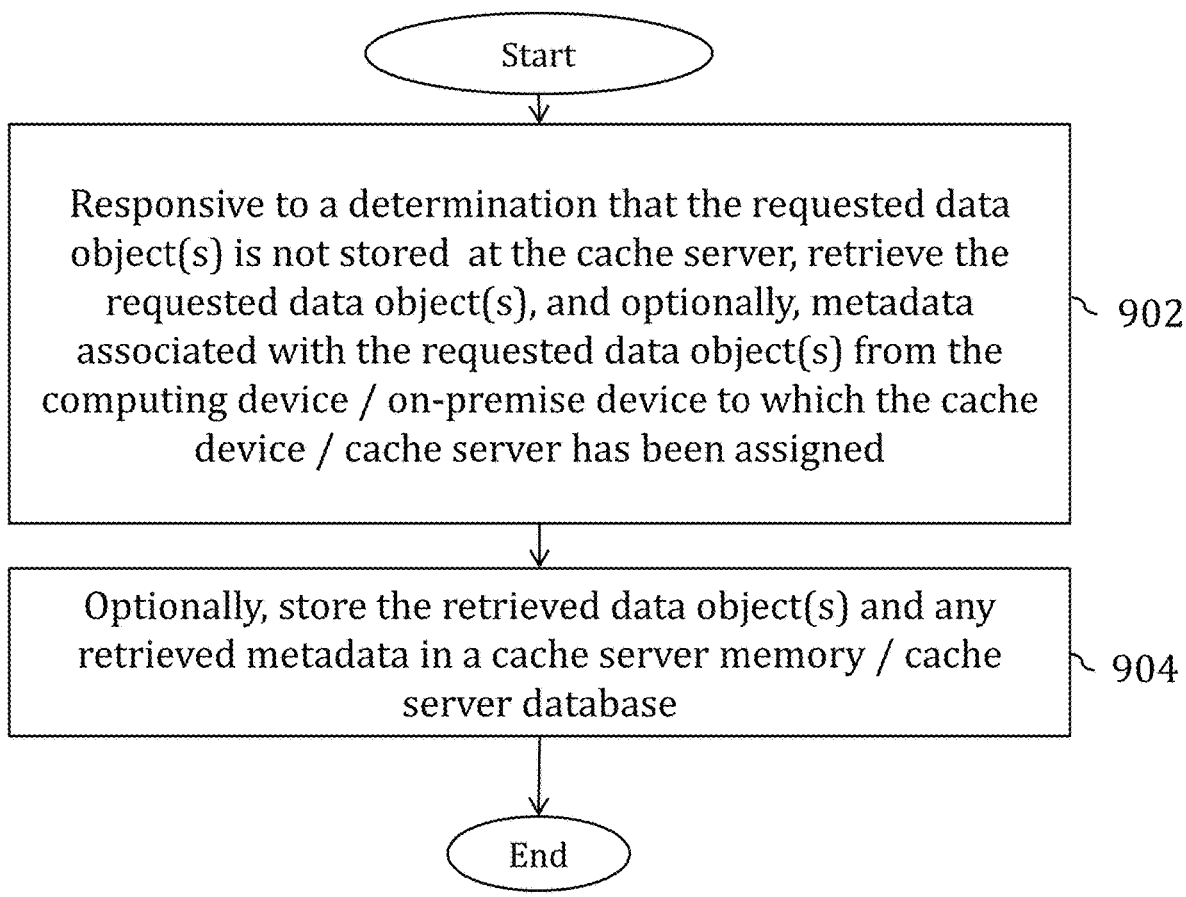
FIG. 9 is a flowchart illustrating implementation of a step of the method of FIG. 7, wherein, responsive to a determination that a requested data object(s) is not stored at a cache device/cache server, the requested data object(s) is retrieved from a computing device/on-premise device.

FIG. 9 is a flowchart illustrating implementation of step 708 within the method of FIG. 7, wherein, responsive to a determination that a requested data object(s) is not stored at cache device/cache server 208, 308, the requested data object(s) is retrieved from the computing device/on-premise device 202, 302 to which the cache device/cache server 208, 308 is assigned or corresponds. The method of FIG. 9 may be implemented partially or wholly within any of system environments 400, 500 of FIGS. 4 and 5 respectively.

Step 902 comprises responding to a determination that a requested data object(s) (i.e. data object(s) requested by the remote server) is not stored at cache device/cache server 208, 308, by retrieving the requested data object(s), and optionally, retrieving metadata associated with the requested data object(s), from the computing device/on-premise device 202, 302 to which the cache device/cache server 208, 308 has been assigned.

In an embodiment, at step 902 the requested data object(s) and optionally any metadata, may be retrieved from the computing device/on-premise device 202, 302 and transmitted to remote server 1200, without being first transmitted to the cache device/cache server 208, 308. In another embodiment, the requested data object(s) may be retrieved from the computing device/on-premise device 202, 302 and transmitted to the cache device/cache server 208, 308—whereinafter the cache device/cache server 208, 308 transmits the requested data object onward to the remote server.

The data object(s) received from the cache device/cache server 208, 308 or from the computing device/on-premise device 202, 302 may be stored within the application environment instance (corresponding to the instance of an application software that requires the data object(s)) at the remote server.

Step 904 comprises optionally storing the retrieved data object(s) and any retrieved metadata in a cache server memory/cache server database associated with the cache device/cache server 208, 308.

In embodiments of the invention, the remote server may additionally be configured to write data object(s) and/or metadata that are generated by or modified by a remote application iteration, back to the computing device/on-premise device 202, 302.

Figure 10:
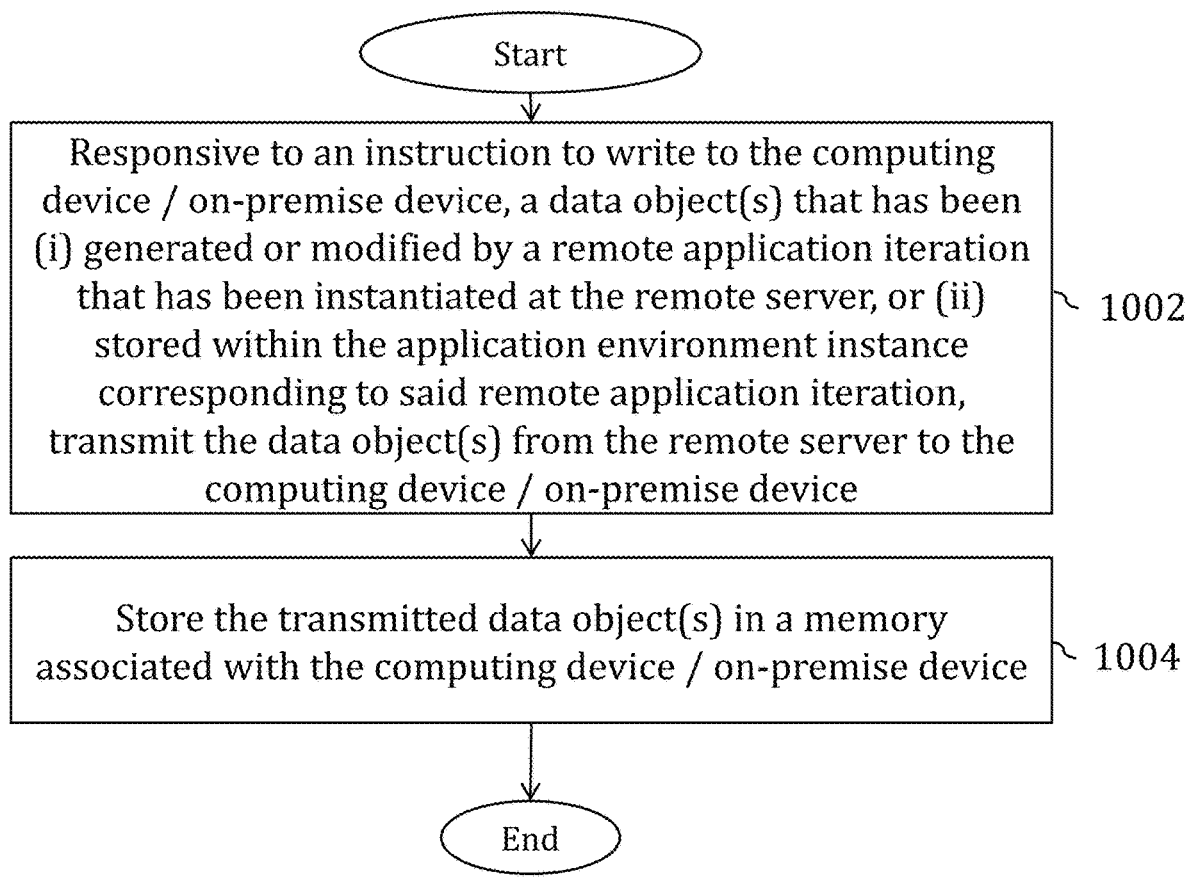
FIG. 10 is a flowchart illustrating a method for writing data object(s) that has been generated or modified by a remote application iteration, back to the computing device/on-premise device 202, 302.

FIG. 10 is a flowchart illustrating a method for writing one or more data object(s) that has been generated or modified by a remote application iteration, from remote server 1200 to the computing device/on-premise device 202, 302. The method of FIG. 10 may be implemented partially or wholly within the system environments 400, 500 of FIGS. 4 and 5 respectively. In an embodiment, the method of FIG. 10 may be implemented partially or wholly within a remote server that is within remote server platform 206, 306 (e.g. remote server 1200).

At step 1002, responsive to an instruction to write a data object(s) that has been generated or modified by the remote application iteration, from remote server 1200 to the computing device/on-premise device 202, 302, remote server 1200 transmits the data object(s) to the computing device/on-premise device 202, 302. It would be understood that the instruction to write the data object(s) may comprise a software instruction implemented during execution of application software code corresponding to a remote application iteration of a software application that is being executed at remote server 1200. In an embodiment, the data object(s) that is intended to be written to the computing device/on-premise device 202, 302 may comprise a data object(s) (i) that has been generated by the remote application iteration or (ii) that is stored within the application environment instance corresponding to said remote application iteration, or (iii) that has been modified by the remote application iteration.

Step 1004 comprises storing the data object(s) that has been transmitted from remote server 1200 to the computing device/on-premise device 202, 302, in a memory associated with the computing device/on-premise device 202.

Figure 11:
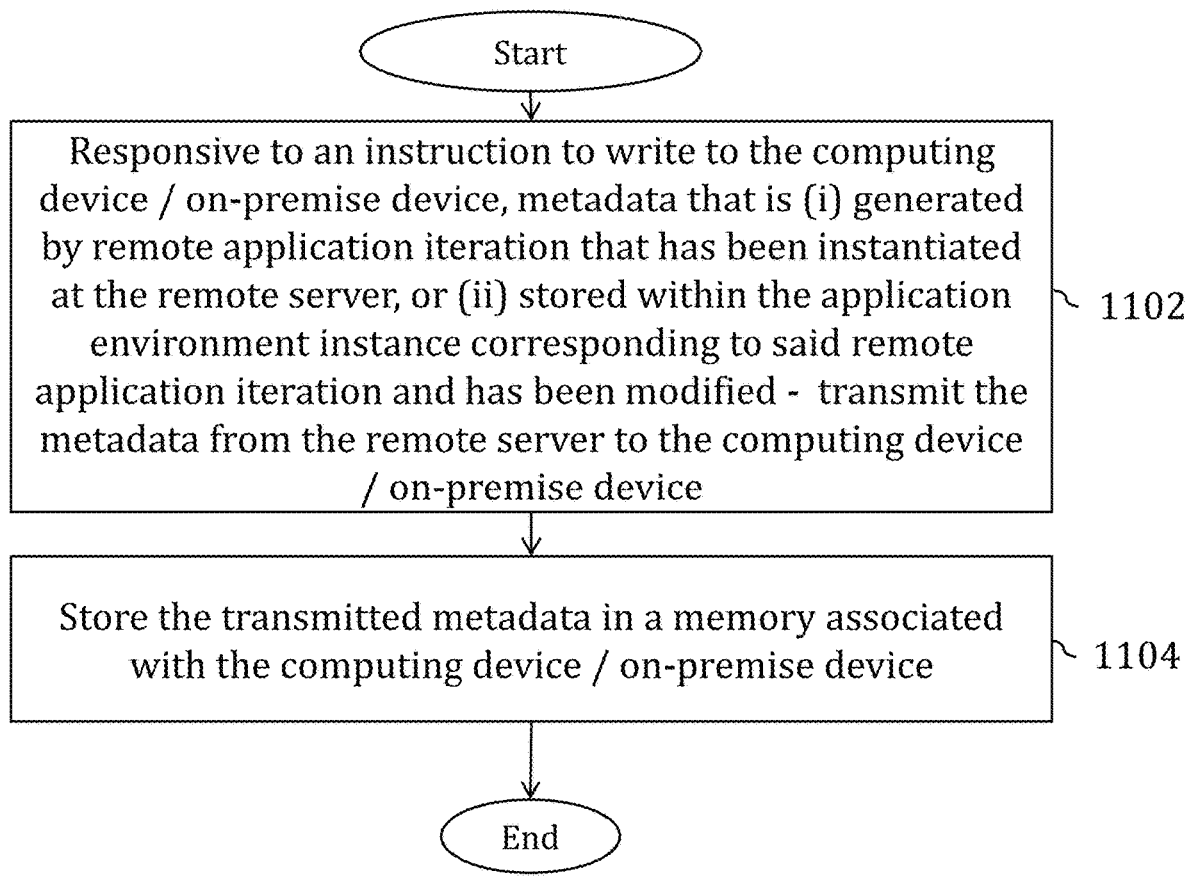
FIG. 11 is a flowchart illustrating a method for writing metadata that has been generated by a remote application iteration, back to the computing device/on-premise device 202, 302.

FIG. 11 is a flowchart illustrating a method for writing metadata that has been generated by a remote application iteration, back to the computing device/on-premise device 202, 302. The method of FIG. 11 may be implemented partially or wholly within the system environments 400, 500 of FIGS. 4 and 5 respectively. In an embodiment, the method of FIG. 10 may be implemented partially or wholly within a remote server that is within remote server platform 206, 306 (e.g. remote server 1200). In an embodiment, metadata may be written back to the computing device/on-premise device in response to, or as a consequence of, data object(s) to which said metadata corresponds, being written to the computing device/on-premise device 202, 302 (for example, in accordance with the method of FIG. 10).

At step 1102, responsive to an instruction to write metadata (for example, metadata that has been generated or modified by the remote application iteration, from remote server 1200 to the computing device/on-premise device 202, 302), remote server 1200 transmits the metadata to the computing device/on-premise device 202, 302. It would be understood that the instruction to write the metadata may comprise a software instruction implemented during execution of application software code corresponding to a remote application iteration of a software application that is being executed at remote server 1200. In an embodiment, the metadata that is intended to be written to the computing device/on-premise device 202, 302 may comprise metadata (i) that has been generated by the remote application iteration or (ii) that is stored within the application environment instance corresponding to said remote application iteration, or (iii) that has been modified by the remote application iteration.

Step 1104 comprises storing the metadata that has been transmitted from remote server 1200 to the computing device/on-premise device 202, 302, in a memory associated with the computing device/on-premise device 202.

FIG. 12 illustrates an exemplary remote server 1200 configured to implement the present invention.

Remote server 1200 may comprise any processor based server system configured for data processing operations and network based communication. In specific embodiments, remote server 1200 may comprise one or more servers. Remote server 1200 may include (i) an operator interface 1202 configured to enable an operator to configure or control the remote server 1200, (ii) processor 1204 configured for data processing operations within remote server 1200, (iii) transceiver 1206 configured for enabling network communication to and from remote server 1200, and (iv) memory 1208, which memory 1208 may include transitory memory and/or non-transitory memory.

In an exemplary embodiment, memory 1208 may have stored therewithin, (i) an operating system 1210, (ii) a processor implemented application iteration controller 1212, (iii) a processor implemented data classification controller 1214, (iv) a processor implemented data retrieval process switch 1216, (v) a processor implemented cache device/cache server communication controller 1218. (vi) a processor implemented computing device/on-premise device communication controller 1220, (vii) a computing device/on-premise device communication controller 1220, (vii) a processor implemented data object write controller 1222, and (viii) a processor implemented metadata write controller 1224.

In an embodiment of remote server 1200, operating system 1210 is configured for managing device hardware and software resources and that provides common services for software programs implemented within remote server 1200.

In an embodiment of remote server 1200, the processor implemented application iteration controller 1212 is configured for generating and controlling the execution of one or more remote application iterations being executed at remote server 1200, in accordance with methods discussed above.

In an embodiment of remote server 1200, processor implemented data classification controller 1214, is configured for analyzing data required by application software code that is under execution at a remote server/remote server platform, and further, may also be configured for determining whether said data comprises data object(s) or metadata, for the purpose of implementing step 610 of the method of FIG. 6.

In an embodiment of remote server 1200, processor implemented data retrieval process switch 1216 is configured for selecting between a first data retrieval process, and a second data retrieval process for retrieval of data required by application software code that is under execution at a remote server/remote server platform—in accordance with method step 612 of the method of FIG. 6.

In an embodiment of remote server 1200, processor implemented cache device/cache server communication controller 1218 is configured to enable and control network communication between remote server 1200 and cache device/cache server 208, 308—for example, for establishing a communication session between remote server 1200 and cache device/cache server 208, 308 for the purposes of data object(s) retrieval from cache device/cache server 208, 308.

In an embodiment of remote server 1200, processor implemented computing device/on-premise device communication controller 1220 is configured to enable and control network communication between remote server 1200 and computing device/on-premise device 202, 302—for example, for establishing a communication session between remote server 1200 and computing device/on-premise device 202, 302 for the purposes of any of data object(s) retrieval or metadata retrieval from cache device/cache server 208, 308, or for the purposes of implementing data object(s) write operations or metadata write operations to computing device/on-premise device 202, 302.

In an embodiment of remote server 1200, processor implemented data object write controller 1222 is configured to implement data object write operations to computing device/on-premise device 202, 302—for implementing the method of FIG. 10.

In an embodiment of remote server 1200, processor implemented metadata write controller 1224 is configured to implement metadata write operations to computing device/on-premise device 202, 302—for implementing the method of FIG. 11.

It will be understood that remote server 1200 may be configured to implement one or more of the methods steps and process flows discussed above in connection with FIGS. 6 to 11.

Figure 13:
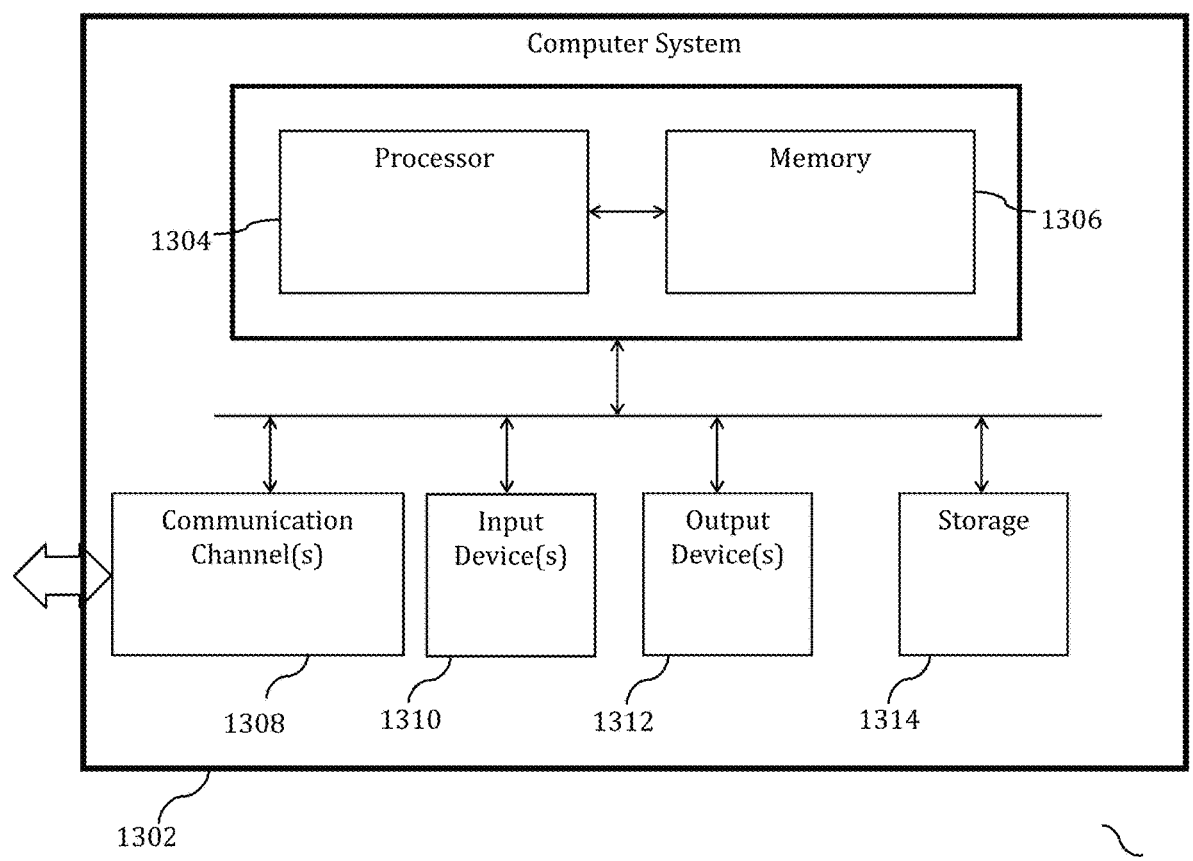
FIG. 13 illustrates an exemplary computer system according to which various embodiments of the present invention may be implemented.

FIG. 13 illustrates an exemplary computer system according to which various embodiments of the present invention may be implemented.

System 1300 includes computer system 1302 which in turn comprises one or more processors 1304 and at least one memory 1306. Processor 1304 is configured to execute program instructions- and may be a real processor or a virtual processor. It will be understood that computer system 1302 does not suggest any limitation as to scope of use or functionality of described embodiments. The computer system 1302 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1302 in accordance with the present invention may include one or more servers, desktops, laptops, tablets, smart phones, mobile phones, mobile communication devices, phablets and personal digital assistants. In an embodiment of the present invention, the memory 1306 may store software for implementing various embodiments of the present invention. The computer system 1302 may have additional components. For example, the computer system 1302 may include one or more communication channels 1308, one or more input devices 1310, one or more output devices 1312, and storage 1314. An interconnection mechanism (not shown) such as a bus, controller, or network, interconnects the components of the computer system 1302. In various embodiments of the present invention, operating system software (not shown) provides an operating environment for various softwares executing in the computer system 1302 using a processor 1304, and manages different functionalities of the components of the computer system 1302.

The communication channel(s) 1308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1310 may include, but is not limited to, a touch screen, a keyboard, mouse, pen, joystick, trackball, a voice device, a scanning device, or any another device that is capable of providing input to the computer system 1302. In an embodiment of the present invention, the input device(s) 1310 may be a sound card or similar device that accepts audio input in analog or digital form. The output device(s) 1312 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1302.

The storage 1314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1302. In various embodiments of the present invention, the storage 1314 may contain program instructions for implementing any of the described embodiments.

In an embodiment of the present invention, the computer system 1302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1302. The method described herein is typically implemented as a computer program product, comprising a set of program instructions that is executed by the computer system 1302 or any other similar device. The set of program instructions may be a series of computer readable codes stored on a tangible medium, such as a computer readable storage medium (storage 1314), for example, diskette, CD-ROM, ROM, flash drives or hard disk, or transmittable to the computer system 1302, via a modem or other interface device, over either a tangible medium, including but not limited to optical or analogue communications channel(s) 1308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers multiple and significant advantages.

A principle advantage over the existing state of the art is that the invention enables dynamic or need based retrieval of data object(s) from on-premise devices, thereby reducing the time and network latency involved in provisioning an application environment that is necessary for execution of a remote application iteration, at a remote server.

The invention also enables users to run multiple remote iterations of the client application software within a remote server platform. In this aspect as well, the ability to implement dynamic or need based retrieval of data object(s) reduces the exponential increase in the data and network latency overheads that are typically observed in prior art systems that seek to enable multiple simultaneous cloud based iterations of a client software application. Further, by generating and maintaining an independent and distinct application environment instance corresponding to each remote application iteration of the same client application software that is being executed at the remote server, the invention ensures modularity and security of data corresponding to each remote application iteration.

Yet further, by relying on a cache device/cache server for data retrieval of data object(s) the invention optimizes dynamic retrieval of data objects from a computing device/on-premise device through cache device(s) or cache server(s). Since the cache device/cache server caches data objects that originates from/are retrieved from computing device/on-premise device, that the cached data is available in a more geographically, physically, or logically proximate location to remote server platform. Such proximate storage of cached data results in reducing one or more of data retrieval time, data retrieval cost, and network communication latency, insofar as remote application iterations being executed within remote server platform 206, are concerned. Additionally, by using a cache device/cache server that is an edge device or server of a CDN, the capabilities of the cache device/cache server can be readily scaled in case of increased demand or computing load on the cache device as the number of remote application iterations that are being executed on the remote server platform increases.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein- and in a particular embodiment that is specifically contemplated, the invention is intended to be practiced in the absence of any one or more element which are not specifically disclosed herein.

The invention claimed is:

1. A method for execution of an application software iteration at a remote server through network based access to a on-premise device, the method comprising:
  instantiating at the remote server:
    a remote application iteration of a client application software, wherein said client application software has a corresponding local instance of an application environment stored on the on-premise device; and
    a remote application environment instance that is configured to permit access by the remote application iteration, wherein said remote application environment instance does not include all data objects stored within the local instance of an application environment stored on the on-premise device;
  executing at the remote server, application software code corresponding to the remote application iteration;
  identifying data required by the application software code under execution;
  selecting one of a first data retrieval process and a second data retrieval process for retrieving the identified data, wherein:
    the first data retrieval process is selected in response to determining that the identified data comprises a data object;
    the second data retrieval process is selected in response to determining that the identified data comprises metadata;
  and implementing the selected first data retrieval process or second data retrieval process for retrieving the identified data, wherein:
    implementing the first data retrieval process comprises transmitting a request for retrieval of the identified data to a first data source;
    implementing the second data retrieval process comprises transmitting a request for retrieval of the identified data to a second data source; and
    the first data source and the second data source are distinct.

2. The method as claimed in claim 1, further comprising:
  storing retrieved data that has been retrieved through implementation of the selected first data retrieval process or second data retrieval process, within the remote application environment instance; and
  executing the application software code corresponding to the remote application iteration, based on the retrieved data.

3. The method as claimed in claim 1, wherein:
  the first data source is a cache device assigned to the on-premise device; and
  the second data source is the on-premise device.

4. The method as claimed in claim 1, wherein implementing the first data retrieval process comprises:
  transmitting from the remote server to a cache device assigned to the on-premise device, a request for retrieval of the data object that comprises the identified data; and
  responding to a determination that the requested data object is stored at the cache device by:
    retrieving the requested data object from a memory of the cache device; and
    transmitting the requested data object from the cache device to the remote server.

5. The method as claimed in claim 1, wherein implementing the first data retrieval process comprises:
  transmitting from the remote server to a cache device assigned to the on-premise device, a request for retrieval of the data object that comprises the identified data; and
  responding to a determination that the requested data object is not stored at the cache device by:
    retrieving the requested data object from a memory of the on-premise device; and
    transmitting the requested data object from the on-premise device to the remote server.

6. The method as claimed in claim 5, wherein transmission of the requested data object from the on-premise device to the remote server circumvents the cache device.

7. The method as claimed in claim 5, wherein:
  the requested data object is transmitted from the on-premise device to the remote server through the cache device; and
  a copy of the data object received from the on-premise device is stored at the cache device.

8. The method as claimed in claim 1, wherein implementing the second data retrieval process comprises:
  transmitting from the remote server to the on-premise device, a request for retrieval of the metadata that comprises the identified data;
  retrieving the requested metadata from a memory of the on-premise device; and
  transmitting the requested metadata from the on-premise device to the remote server.

9. The method as claimed in claim 1, further comprising:
  transmitting metadata or a data object that has been generated or modified at the remote server, from the remote server to the on-premise device; and
  storing the transmitted metadata or data object in a memory of the on-premise device.

10. A system for execution of an application software iteration at a remote server through network based access to a on-premise device, the system comprising a remote server configured for:
  instantiating:
    a remote application iteration of a client application software, wherein said client application software has a corresponding local instance of an application environment stored on the on-premise device; and
    a remote application environment instance that is configured to permit access by the remote application iteration, wherein said remote application environment instance does not include all data objects stored within the local instance of an application environment stored on the on-premise device;
  executing at the remote server, application software code corresponding to the remote application iteration;
  identifying data required by the application software code under execution;
  selecting one of a first data retrieval process and a second data retrieval process for retrieving the identified data, wherein:
    the first data retrieval process is selected in response to determining that the identified data comprises a data object;
    the second data retrieval process is selected in response to determining that the identified data comprises metadata;

and implementing the selected first data retrieval process or second data retrieval process for retrieving the identified data, wherein:
implementing the first data retrieval process comprises transmitting a request for retrieval of the identified data to a first data source;
implementing the second data retrieval process comprises transmitting a request for retrieval of the identified data to a second data source; and
the first data source and the second data source are distinct.

11. The system as claimed in claim 10, wherein said remote server is further configured for:
storing retrieved data that has been retrieved through implementation of the selected first data retrieval process or second data retrieval process, within the remote application environment instance; and
executing the application software code corresponding to the remote application iteration, based on the retrieved data.

12. The system as claimed in claim 10, wherein:
the first data source is a cache device assigned to the on-premise device; and
the second data source is the on-premise device.

13. The system as claimed in claim 10, wherein the remote server is configured such that implementing the first data retrieval process comprises:
transmitting from the remote server to a cache device assigned to the on-premise device, a request for retrieval of the data object that comprises the identified data; and
responding to a determination that the requested data object is stored at the cache device by:
retrieving the requested data object from a memory of the cache device; and
transmitting the requested data object from the cache device to the remote server.

14. The system as claimed in claim 10, wherein the remote server is configured such that implementing the first data retrieval process comprises:
transmitting from the remote server to a cache device assigned to the on-premise device, a request for retrieval of the data object that comprises the identified data; and
responding to a determination that the requested data object is not stored at the cache device by:
retrieving the requested data object from a memory of the on-premise device; and
transmitting the requested data object from the on-premise device to the remote server.

15. The system as claimed in claim 14, wherein transmission of the requested data object from the on-premise device to the remote server circumvents the cache device.

16. The system as claimed in claim 14, wherein:
the requested data object is transmitted from the on-premise device to the remote server through the cache device; and
a copy of the data object received from the on-premise device is stored at the cache device.

17. The system as claimed in claim 10, wherein the remote server is configured such that implementing the second data retrieval process comprises:
transmitting from the remote server to the on-premise device, a request for retrieval of the metadata that comprises the identified data;
retrieving the requested metadata from a memory of the on-premise device; and
transmitting the requested metadata from the on-premise device to the remote server.

18. The system as claimed in claim 10, wherein the remote server is configured for:
transmitting metadata or a data object that has been generated or modified at the remote server, from the remote server to the on-premise device; and
storing the transmitted metadata or data object in a memory of the on-premise device.

19. A computer program product for execution of an application software iteration at a remote server through network based access to an on-premise device, comprising a non-transitory computer usable medium having a computer readable program code embodied therein, the computer readable program code comprising instructions for implementing within a processor based computing system, the steps of:
antiating at the remote server:
a remote application iteration of a client application software, wherein said client application software has a corresponding local instance of an application environment stored on the on-premise device; and
a remote application environment instance that is configured to permit access by the remote application iteration, wherein said remote application environment instance does not include all data objects stored within the local instance of an application environment stored on the on-premise device;
executing at the remote server, application software code corresponding to the remote application iteration;
identifying data required by the application software code under execution;
selecting one of a first data retrieval process and a second data retrieval process for retrieving the identified data, wherein:
the first data retrieval process is selected in response to determining that the identified data comprises a data object;
the second data retrieval process is selected in response to determining that the identified data comprises metadata;
and implementing the selected first data retrieval process or second data retrieval process for retrieving the identified data, wherein:
implementing the first data retrieval process comprises transmitting a request for retrieval of the identified data to a first data source;
implementing the second data retrieval process comprises transmitting a request for retrieval of the identified data to a second data source; and
the first data source and the second data source are distinct.

* * * * *